US008447181B2

(12) United States Patent  
Jenkins et al.

(10) Patent No.: US 8,447,181 B2  
(45) Date of Patent: May 21, 2013

(54) METHOD AND APPARATUS FOR DISPLAYING AND IDENTIFYING AVAILABLE WAVELENGTH PATHS ACROSS A NETWORK

(75) Inventors: David W. Jenkins, North Aurora, IL (US); Ramasubramanian Anand, Plainfield, IL (US); Hector Ayala, Chicago, IL (US); Dion Kwun Kit Leung, Aurora, IL (US); Kenneth M. Fisher, Aurora, IL (US)

(73) Assignee: Tellabs Operations, Inc., Naperville, IL (US)

( * ) Notice: Subject to any disclaimer, the term of this patent is extended or adjusted under 35 U.S.C. 154(b) by 1163 days.

(21) Appl. No.: 12/228,776

(22) Filed: Aug. 15, 2008

(65) Prior Publication Data

US 2010/0040366 A1    Feb. 18, 2010

(51) Int. Cl.  
*H04J 14/00*    (2006.01)

(52) U.S. Cl.  
USPC .................. 398/48; 398/45; 398/49; 398/57; 398/79; 398/58; 398/69; 398/3; 398/5; 398/34; 370/235; 370/254; 370/351; 370/400; 709/223; 709/225; 715/736; 715/734

(58) Field of Classification Search  
USPC ............... 398/48, 79, 2, 3, 5, 7, 8, 58, 59, 34, 398/37, 57, 46, 47, 25, 26, 27, 74, 75, 69, 398/83, 38, 33, 45, 49, 50; 370/254, 255, 370/238, 351, 258, 217, 220, 228, 252, 392, 370/235, 400, 401, 395.2; 709/223, 225, 709/224, 220, 221, 242; 715/736, 734, 735  
See application file for complete search history.

(56) References Cited

U.S. PATENT DOCUMENTS

| | | | |
|---|---|---|---|
| 5,027,079 A | 6/1991 | Desurvire et al. | |
| 6,323,994 B1 | 11/2001 | Li et al. | |
| 6,466,972 B1 | 10/2002 | Paul et al. | |
| 6,952,529 B1 | 10/2005 | Mittal | |
| 7,047,496 B2* | 5/2006 | Nelles et al. | 715/736 |
| 7,096,176 B1 | 8/2006 | Hess | |
| 7,096,502 B1 | 8/2006 | Fox et al. | |

(Continued)

OTHER PUBLICATIONS

Momtahan, P., "The Case for Integrating Next-Generation Transport," (White Paper 74.1707E) Tellabs, (Rev. B: Feb. 2007).  
Jenkins, D. W. and Scholtens, D. A., "Metro WDM Network Design & Evolution: Positioning for the Transition to Optical Meshes," (White Paper 74.1717E), Tellabs, (Rev. A: Oct. 2006).

(Continued)

*Primary Examiner* — Hanh Phan  
(74) *Attorney, Agent, or Firm* — Hamilton, Brook, Smith & Reynolds, P.C.

(57) ABSTRACT

Due to demand for more network bandwidth, a need for multi-user optical network topologies has, and will continue to, increase. A method or corresponding apparatus in embodiments of the present invention provide for an availability determination tool for determining and displaying wavelength and subrate availabilities within a network. Benefits of embodiments of a tool include allowing a user to identify the availability and capacity of any wavelength on any network, via an interactive graphical user interface, such as by using three-dimensional representations. In one embodiment, the disclosed availability determination tool allows users to locate and view any combination of available wavelengths between nodes in an optical network topology, and generate graphical and tabular reports of the availability in order to maintain an efficient and organized method or apparatus for determining and controlling wavelengths in a network. Consequently, service providers using the tool can keep performance rates high and costs low.

43 Claims, 21 Drawing Sheets

U.S. PATENT DOCUMENTS

| | | | |
|---|---|---|---|
| 7,623,785 B2 * | 11/2009 | Krishnaswamy et al. | 398/58 |
| 7,684,696 B1 | 3/2010 | Hadden et al. | |
| 7,697,455 B2 * | 4/2010 | Sadanada | 370/254 |
| 8,078,435 B2 | 12/2011 | Jenkins et al. | |
| 2003/0020977 A1 | 1/2003 | Smith et al. | |
| 2003/0071985 A1 | 4/2003 | Mori et al. | |
| 2003/0099018 A1 | 5/2003 | Singh et al. | |
| 2004/0016002 A1 | 1/2004 | Handelman et al. | |
| 2004/0186701 A1 | 9/2004 | Aubin et al. | |
| 2004/0208535 A1 | 10/2004 | Bragg et al. | |
| 2004/0208576 A1 | 10/2004 | Kinoshita et al. | |
| 2004/0214577 A1 | 10/2004 | Borst et al. | |
| 2004/0251962 A1 | 12/2004 | Rosnell et al. | |
| 2005/0036788 A1 | 2/2005 | Matsuoka et al. | |
| 2005/0041600 A1 | 2/2005 | Moffatt et al. | |
| 2005/0066016 A1 | 3/2005 | Bailey et al. | |
| 2005/0175279 A1 | 8/2005 | Nakajima et al. | |
| 2005/0220136 A1 * | 10/2005 | Shinomiya et al. | 370/437 |
| 2006/0019679 A1 | 1/2006 | Rappaport et al. | |
| 2006/0067694 A1 | 3/2006 | Nozu | |
| 2006/0287740 A1 | 12/2006 | Ertel | |
| 2007/0172040 A1 | 7/2007 | Cesarini et al. | |
| 2007/0294342 A1 | 12/2007 | Shah et al. | |
| 2008/0123586 A1 * | 5/2008 | Manser | 370/328 |
| 2008/0279552 A1 | 11/2008 | Ou et al. | |
| 2009/0144700 A1 | 6/2009 | Huff et al. | |
| 2010/0040364 A1 | 2/2010 | Jenkins et al. | |
| 2010/0040366 A1 | 2/2010 | Jenkins et al. | |
| 2010/0042390 A1 | 2/2010 | Jenkins et al. | |
| 2010/0042989 A1 | 2/2010 | Anand et al. | |

OTHER PUBLICATIONS

Papakos, K., et al., "Optical Dynamic Core Networks: Design, Implementation and Engineering Considerations,"(White Paper 74.1825E) Tellabs, (Rev. A: Apr. 2007).

"BER vs. OSNR," *Circadiant Tech Brief*, (Tech Brief No. TB007), (Feb. 2003).

Gariépy, D. and Gang, H., "Measuring OSNR in WDM Systems—Effects of Resolution Bandwidth and Optical Rejection Ratio," EXFO Electro-Optical Engineering Inc., Application Note 098, (May 2005).

Çokrak, A.Cem and Altuncu, A., "Gain and Noise Figure Performance of Erbium Doped Fiber Amplifiers (EDFA)," *J. of Electrical & Electronics Engineering (Istanbul University)*, 4(2):1111-1122 (Jun. 15, 2004).

U.S. Appl. No. 11/354,705, filed Feb. 14, 2006.
U.S. Appl. No. 12/228,762, filed Aug. 15, 2008.
U.S. Appl. No. 12/228,763, filed Aug. 15, 2008.
U.S. Appl. No. 12/228,826, filed Aug. 15, 2008.
Notice of Abandonment, U.S. Appl. No. 11/354,705, Date of mailing: Sep. 27, 2010.
Office Action, U.S. Appl. No. 12/228,826, Date of mailing: Sep. 6, 2011.
Office Action, U.S. Appl. No. 12/228,826, Date of mailing: Mar. 2, 2012.

* cited by examiner

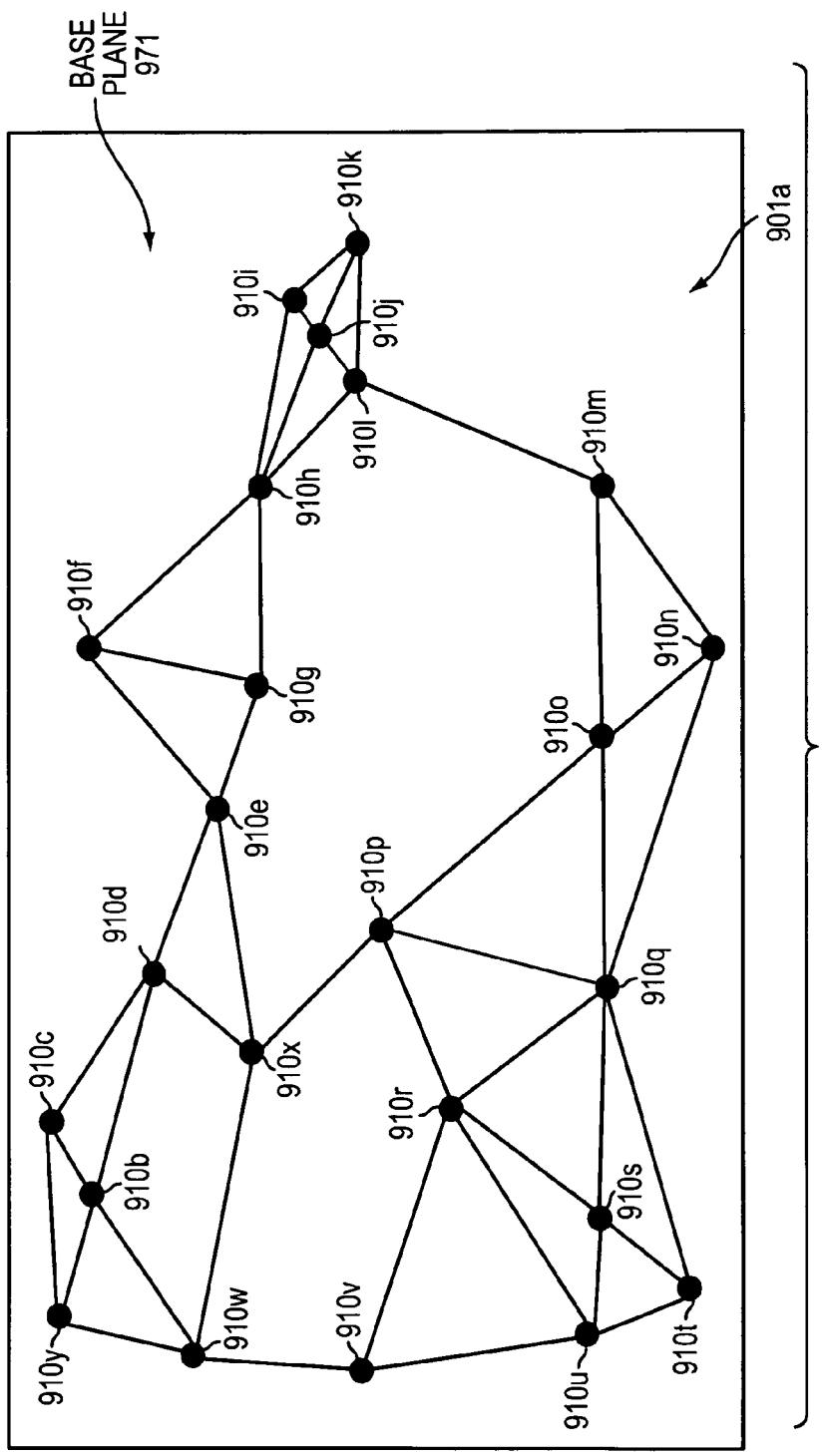

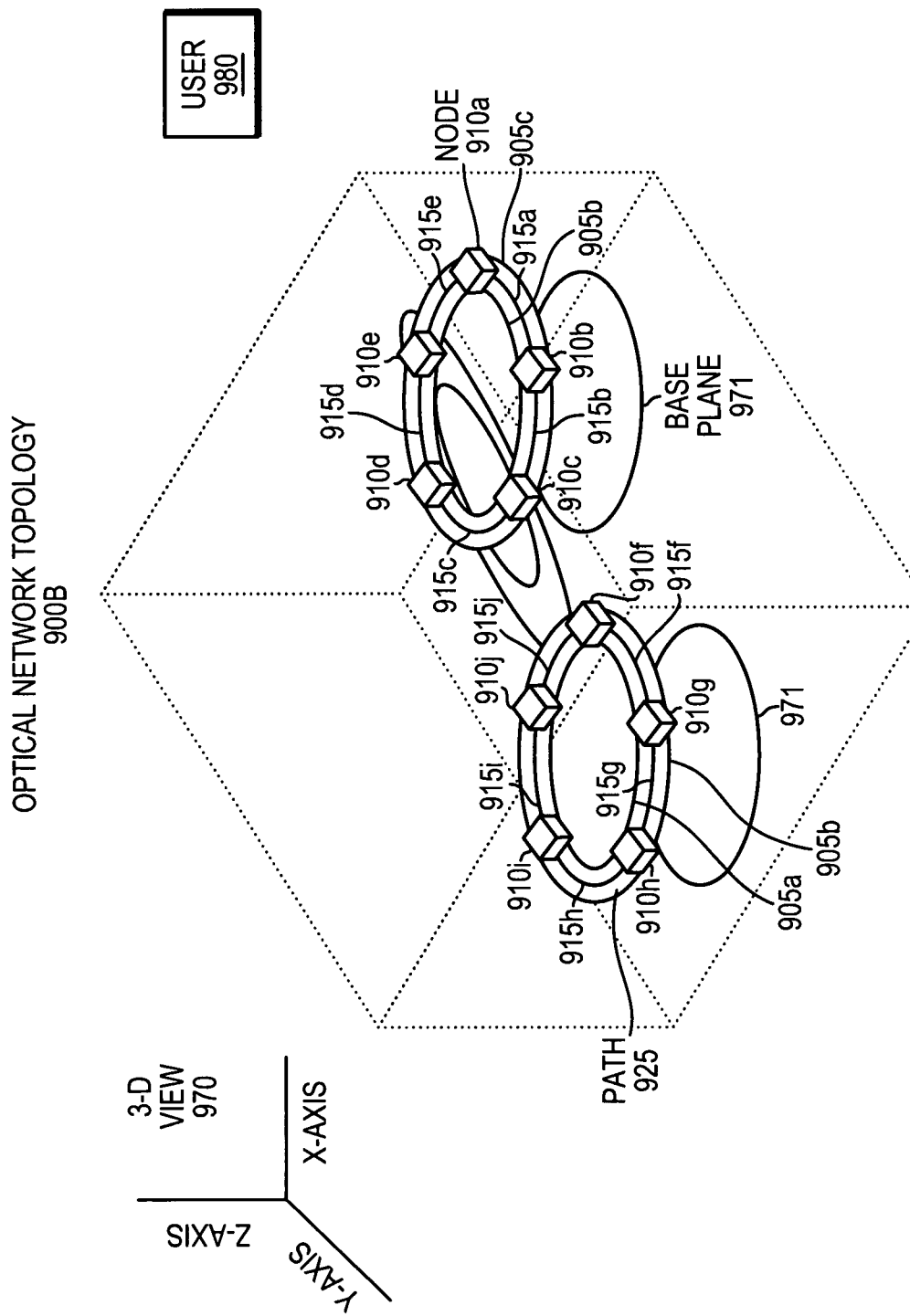

METHOD AND APPARATUS FOR DISPLAYING AND IDENTIFYING AVAILABLE WAVELENGTH PATHS ACROSS A NETWORK

RELATED APPLICATIONS

This application is related to U.S. application Ser. No. 11/354,705, filed on Feb. 14, 2006; and entitled "Method and Apparatus for Designing Any-To-Any Optical-Signal-to-Noise Ratio in Optical Networks;" 2376.2254-000, entitled "Method and Apparatus for Reducing Cost of an Optical Network Amplification in a Network;" and 2376.2263-000, entitled "Method and Apparatus for Simplifying Planning and Tracking of Multiple Installation Configurations;" each of which is being filed concurrently. The entire teachings of the above applications are incorporated herein by reference.

BACKGROUND OF THE INVENTION

Wavelength Division Multiplexing (WDM) is a method by which optical fibers are used to carry multiple light waves of different frequencies. In a WDM network many wavelengths are combined in a single fiber, thereby increasing the carrying capacity of the fiber. Signals are assigned to specific frequencies of light (wavelengths) within a frequency band. This multiplexing of optical wavelengths is analogous to the way radio stations broadcast on different wavelengths as to not interfere with each other. Because each radio channel is transmitted on a different wavelength, a desired channel may be selected using a tuner. WDM channels (wavelengths) are selected in a similar manner. In a WDM network, all wavelengths are transmitted through a fiber, and demultiplexed at a receiving end. The fiber's capacity is an aggregate of the transmitted wavelengths, each wavelength having its own dedicated bandwidth. Dense Wavelength Division Multiplexing (DWDM) is a WDM network in which wavelengths are spaced more closely than in a coarse WDM network. This provides for a greater overall capacity of the fiber.

Modern networks use WDM, including coarse WDM (CWDM) and dense WDM (DWDM), to increase the amount of traffic that can be transmitted through the network. WDM signals may propagate through optical networks, in both clockwise and counterclockwise directions, connecting each node pair via two paths. Alternatively, WDM signals may propagate through the network in only one direction, limiting each node pair to a single connection path.

Many WDM networks use Reconfigurable Optical Add/Drop Multiplexers (ROADMs) to add or drop traffic to or from the network. Selected wavelengths can be added or dropped using the ROADMs by issuing commands from a central Network Management System (NMS). Typically, a ROADM deployment scenario exists where bandwidth needs to be deployed between two locations. Normally, a service provider installs transponders at the locations, balances the power across each span, and starts using the service. This basic approach is much simpler when the network is first installed and an abundance of wavelengths is available. As more connections over the network are created, however, more wavelengths will be needed because, for a given connection, the same wavelength typically needs to be available on every span of the path supporting the connection over the network. Further, if the service provider is planning a resilient service, it must ensure that two contiguous wavelengths are available between each start and end point of each communications path. If a contiguous wavelength between the two locations is not available, then an optical connection between the locations typically may not be established.

SUMMARY OF THE INVENTION

One example embodiment of the present invention is a method, and corresponding apparatus, for determining whether a wavelength is available in an optical network topology. The method may display representations of nodes and physical links of the topology. The method may further enable selection of the representations of the physical links to form a path through the topology. Once the path is selected, the method determines wavelength availability along the path and reports the wavelength availability of at least a subset of the wavelengths along the path.

A second example embodiment of the present invention is a method, and corresponding apparatus, for determining whether a wavelength is available in an optical network topology. The method may similarly display representations of nodes and physical links of the topology. The method may further enable selection of at least two nodes of the optical network topology to determine paths connecting the selected nodes through the topology. Once the paths are determined, the method determines wavelength availability along the paths and reports the available paths connecting the nodes, along with the wavelength availability along the paths.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 9A and 9B are schematic diagrams displaying representations of nodes and physical links of a topology in a base plane of a three-dimensional view, where the available wavelengths are represented in respective planes elevated above the base plane according to an example embodiment of the present invention.

DETAILED DESCRIPTION OF THE INVENTION

Figure 1:
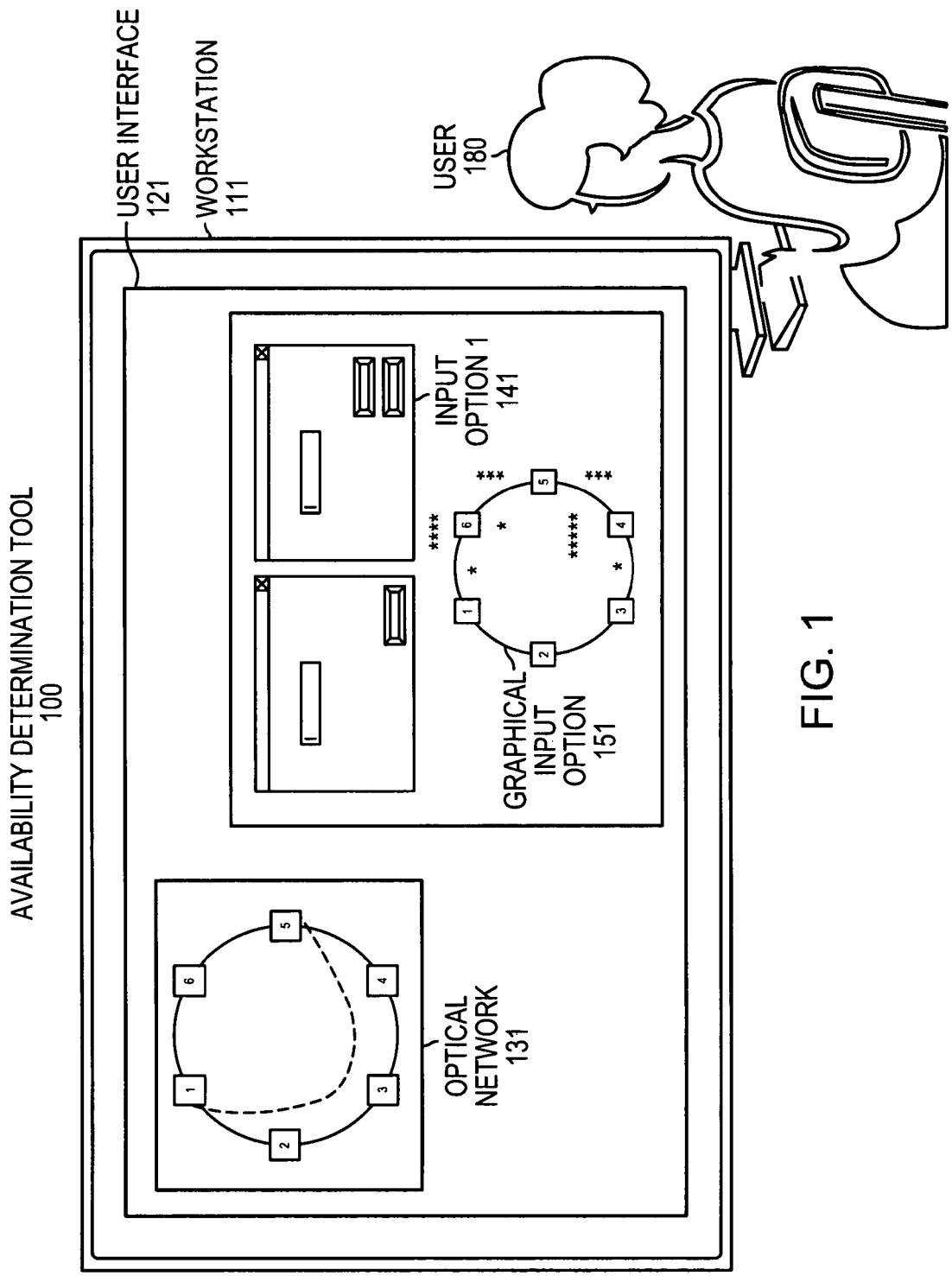
FIG. 1 is a diagram of a user viewing an optical network topology on an availability determination tool for the purpose of determining wavelength availability in an optical network using an example embodiment of the present invention.

A description of example embodiments of the invention follows.

Example embodiments of the present invention enable users, such as network providers, to visualize, choose, and display wavelength utilization across an optical network topology for a network designer to provision wavelengths in a ring, mesh, RPR (packet), or network unprotected environment. According to the embodiments, a network designer has the freedom to route wavelengths from any node to any other node within the network; thus allowing for some wavelengths to be organized in rings over a set of fiber links, while other wavelengths can be organized on some, but not all, of the same links (paths).

In some optical networks, wavelengths are not tied to a particular topology, which means that a network designer must have knowledge as to what wavelengths and, in some cases, subrates are available if choosing to activate a wavelength within the topology. Typically, in example embodiments, availability refers to unallocated paths through the network that can support traffic demands with or without the addition of cards within one or a set of network elements (not including the addition of more network elements). If the network designer activates a wavelength on a path of the topology that is already provisioned on that path, faults occur, as understood in the art. Embodiments of the present invention enable the network designer to determine what wavelengths are available over what paths and provides the network designer with interactive feedback on how the wavelengths can be assigned to the paths. Further, some embodiments of this invention display wavelength usage across the entire network, including any or all sub-networks, and an interactive approach is provided to aid network designers in finding an available path or multiple available paths throughout the network.

Further, embodiments may include an availability determination tool that can include a method or apparatus for selecting two nodes on a graphical representation of the network and listing the possible existing paths through the network with a listing of the available bandwidth on those paths. The availability determination tool may be a stand alone utility, or may be a feature of a larger network planning tool. Also included in an embodiment of this invention is a tool that displays and reports possible routes for new wavelengths that can be defined to carry those demands.

An example embodiment of the present invention allows a network designer (i.e., user) to determine the available wavelengths that connect two points (e.g., nodes in the network) and determines an amount of traffic that the wavelengths can carry throughout. By displaying this information to a user, the user may view the graphical interface to enable the user to select multiple links and be informed of available wavelengths that span those links. The user can also select end (i.e., destination) nodes, and the graphical interface system informs the user of common rings already existing and what wavelengths are available between the end nodes.

Some embodiments of the present invention can include determinations and displays of representations of nodes in an optical network topology, where the nodes can include representations of ROADMs, which allow traffic to be added to wavelengths at one node and removed (demultiplexed) from a wavelength at another node. The availability determination tool, according to some example embodiments of the present invention, can determine alternative paths that traffic may take if certain wavelengths are full or cannot maintain the amount of traffic. The tool can use wavelength interchange, which allows information traveling on one wavelength to be transferred to another wavelength via an interchange converter. By enabling traffic to be transmitted via multiple different wavelengths, embodiments of the present invention can reroute wavelengths to change the wavelength availability that is available for use by a network designer.

Some embodiments of the present invention can determine if a wavelength is available and report the information to the user using a plurality of different methods, including a graphical user interface that renders three-dimensional interpretations of the representations of nodes and physical links of an optical network topology. Other embodiments of the present invention include a graphical user interface, which can enable the user to view the wavelength availability information in a tabular form and allow the user to highlight, or the tool can automatically highlight, the wavelength availability in the tabular form. Some embodiments of the present invention include a display of the optical network topology in a three-dimensional view that can allow the user to view the representations of nodes, physical links, wavelength availability, and paths through the network.

FIG. 1 is a diagram of a user 180 using an availability determination tool 100 to determine and view wavelength availability and subrate availability in an optical ring network 131 according to an example embodiment of the availability determination tool 100. In an example embodiment of the present invention, the user 180 can use the tool 100 to view the available elements of the optical network 131, such as the paths or nodes of the optical network 131, via a user interface 121, such as a workstation 111. As understood in the art, typical characteristics of an optical network include the network topology, the number and distribution of nodes, and the number, distribution, and type of optical network elements. Next, the user 180 can choose among a plurality of input options, including a system prompt input method 141 or a graphical user interface 151 to choose the paths or nodes for which the user 180 requests the availability determination tool 100 to determine available wavelengths. After the user 180 selects the desired network elements necessary for the availability determination tool 100 to determine wavelength availability and subrate availability, the tool 100 runs internal iterations.

Figure 2:
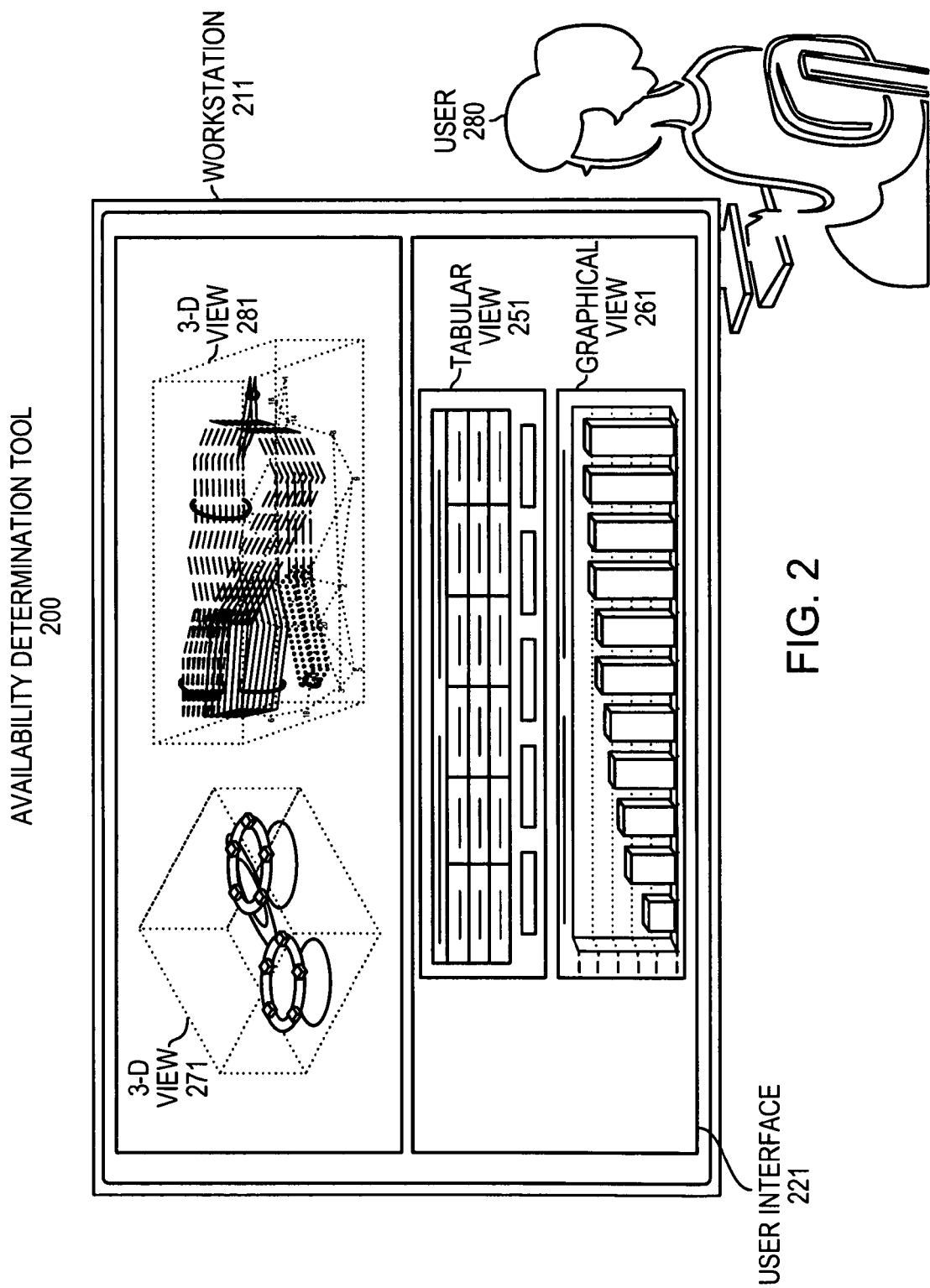
FIG. 2 is a diagram of a user viewing a three-dimensional rendering and a graphical user interface of an availability determination tool for the purpose of knowing wavelength availability in an optical network using an example embodiment of the present invention.

FIG. 2 is a diagram of a user 280 viewing a three-dimensional rendering and a graphical user interface of an availability determination tool 200 after the internal iterations run, for the purpose of knowing wavelength availability in an optical network using an example embodiment of the present invention. Once the availability determination tool 200 completes the internal iterations, optionally using traditional or proprietary algorithms, the tool 200 reports indications of wavelength and subrate availability to the user 280 via a display, such as a graphical user interface 221. Such displays may include a plurality of three-dimensional views 271 and 281 of the optical network topology, including the nodes, fiber-optical links, a base plane, a series of paths connecting the nodes in sub-networks, and the available wavelengths in respective planes above the base plane. The availability determination tool 200 displays results to the user 280 in any of a plurality of views, including a tabular view 251 or a graphical view 261, so that the user 280 can plan accordingly with regards to the available wavelengths on any given optical network topology.

Figure 3:
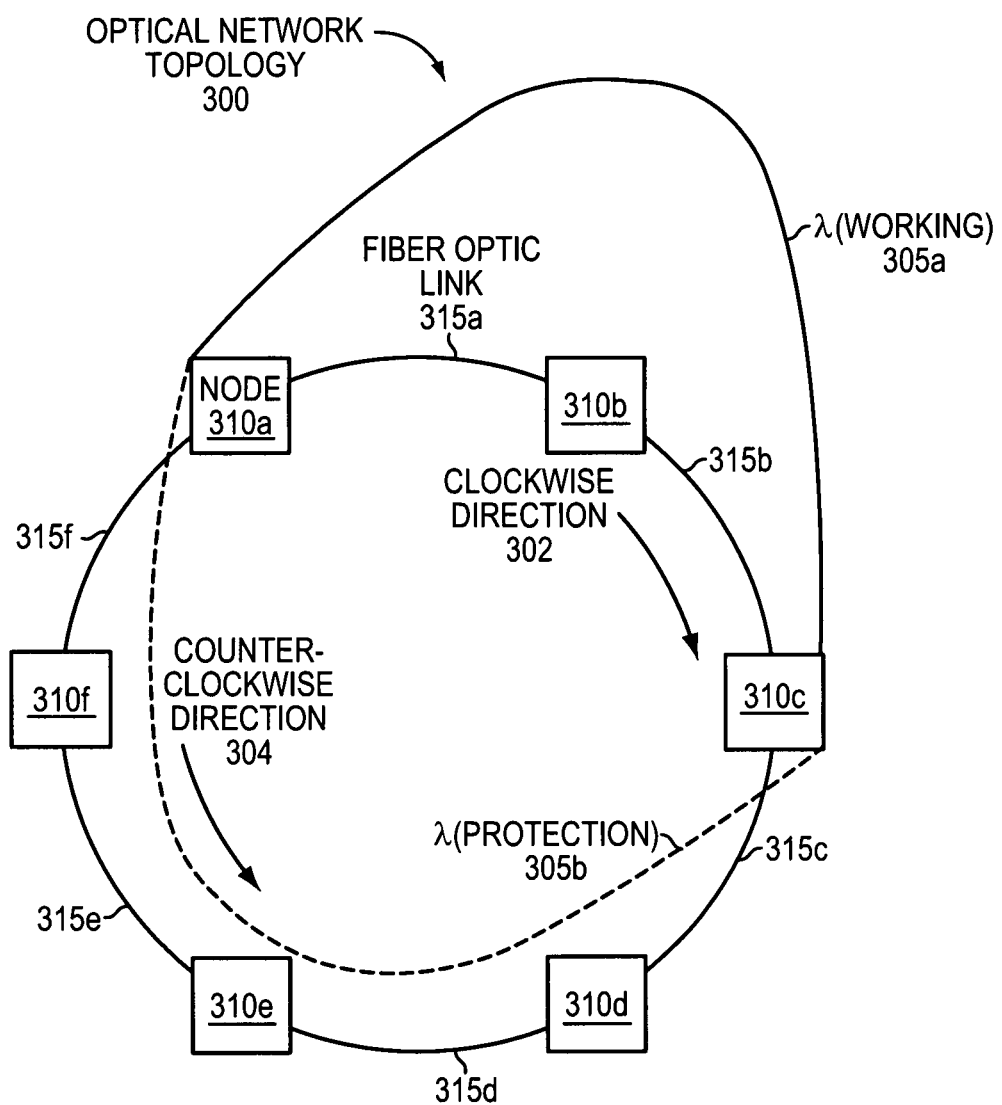
FIG. 3 is a schematic diagram of an example topology, representing one working wavelength and one protection wavelength that connect two nodes in a network.

FIG. 3 is a schematic diagram that illustrates an optical network topology 300 including a plurality of nodes 310a-f connected via a plurality of fiber optic links 315a-f. For example, node 310a connects to node 310b via a first fiber optic link 315a in a clockwise direction 302. A working wavelength 305a travels in one direction, and a protection wavelength 305b travels in the opposite direction. The working wavelength 305a typically takes a shorter path between the two nodes 310a-b, and the protection wavelength 305b takes a longer path. The frequency of the working and protection wavelengths may be identical, as they travel in opposite directions.

Typically, nodes may include or may be located at central offices (not shown), communications sites, communications devices, etc. The topology 300 shown in FIG. 3 is an example embodiment of a ring topology, whereas other networks and sub-networks may have other topologies including, but not limited to, linear, mesh, unidirectional, bidirectional, or hybrid topologies. Additionally, networks may have any number of nodes and fiber optic links, and those links may include more than one fiber optic link. The example methods and apparatuses disclosed herein may be used to at least determine or display wavelength availabilities, or subrate availabilities, or any combination thereof, on the network with any suitable topology, any number of nodes, and any number of fiber optic links.

Figure 4:
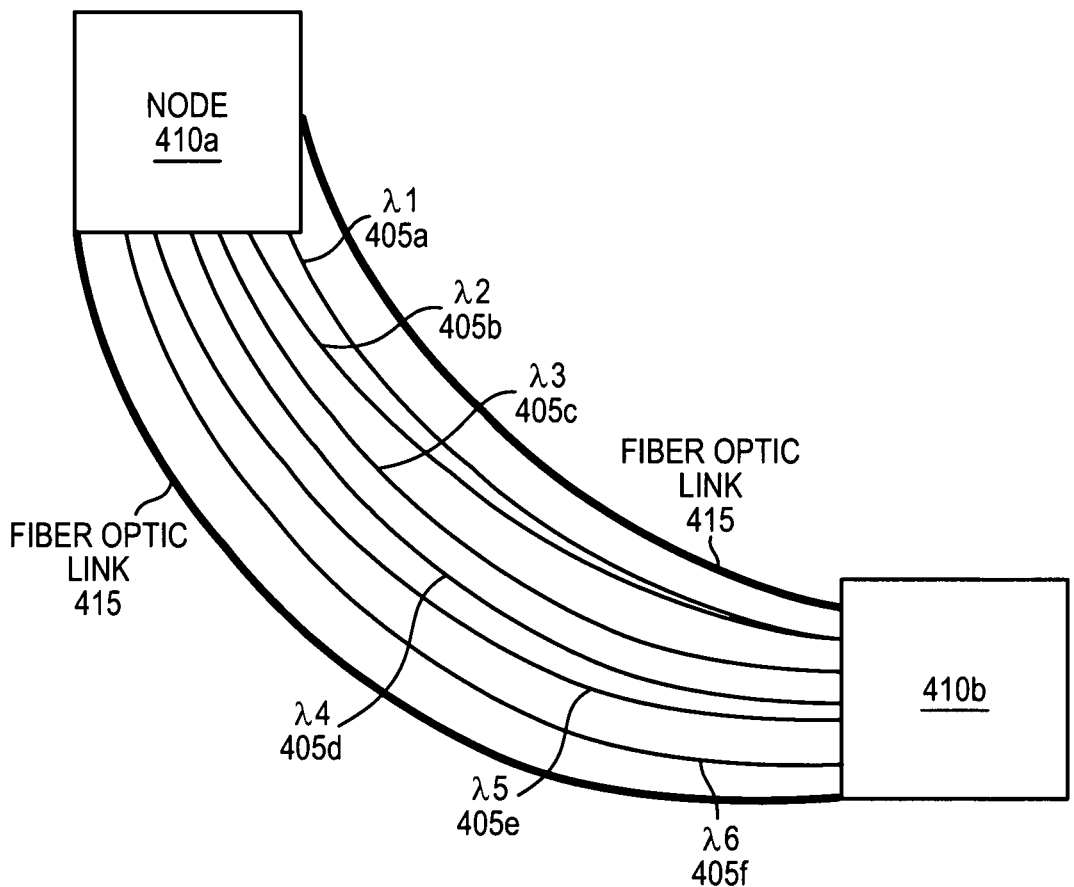
FIG. 4 is a schematic diagram of a fiber-optic link enlarged to show examples of different wavelengths that can exist on a single link in a network.

FIG. 4 is a schematic diagram illustrating an expanded view of a fiber-optic cable to show separate wavelengths 400 that includes a plurality of different wavelengths 405a-f coursing through the cable. A fiber-optic link 415, in this example embodiment of the present invention, connects node 410a to node 410b, and traffic can be transmitted from node 410a to node 410b (or vice versa) via any of the available wavelengths 405a-f carried inside the fiber-optic link 415.

In an example embodiment of the present invention, FIG. 4 represents a node-to-node WDM system, in which several wavelengths 405a-f are multiplexed at one node 410a, the node 410a transmits the combined signals across some distance of the link 415 on the different wavelengths 405a-f that are included in the link 415. The wavelengths 405a-f are then demultiplexed at a destination node 410b, which may be automatically chosen by the system or may be specifically chosen by a user. In order to enable the user to have knowledge of what wavelengths 405a-f are available to carry a signal from a selected or automated starting point (e.g., node 410a) to a selected or automated destination point (e.g., node 410b), the user may be supplied with information in a tabular, graphical, pictorial, three-dimensional, or some other suitable visual display on a user interface.

Figure 5:
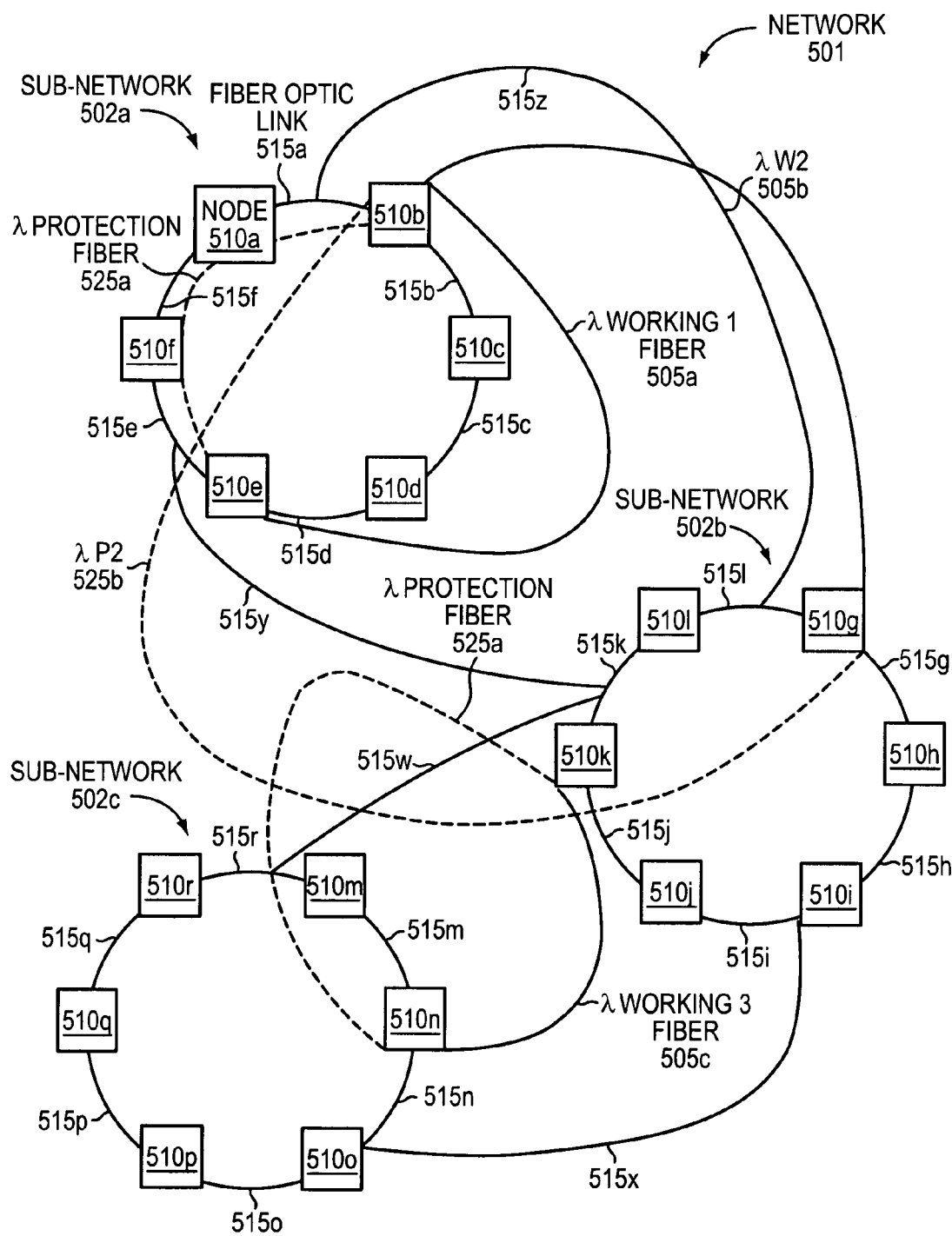
FIG. 5 is network diagram showing a display of wavelength availability along with representations of nodes and physical links of the topology, according to an example embodiment of the present invention.

FIG. 5 is a schematic diagram illustrating an optical network topology 500, which includes multiple ring networks that can be represented to a user of an example embodiment of the availability determination tool. The sub-networks send can signals via different wavelengths to and from the different nodes 500a-r located on the different sub-networks 502a-c, on a network 501. As previously mentioned, there are many types of networks available, and this example embodiment of a ring network is not meant to limit the network configurations to which the availability determination tool can be applied.

Figure 6:
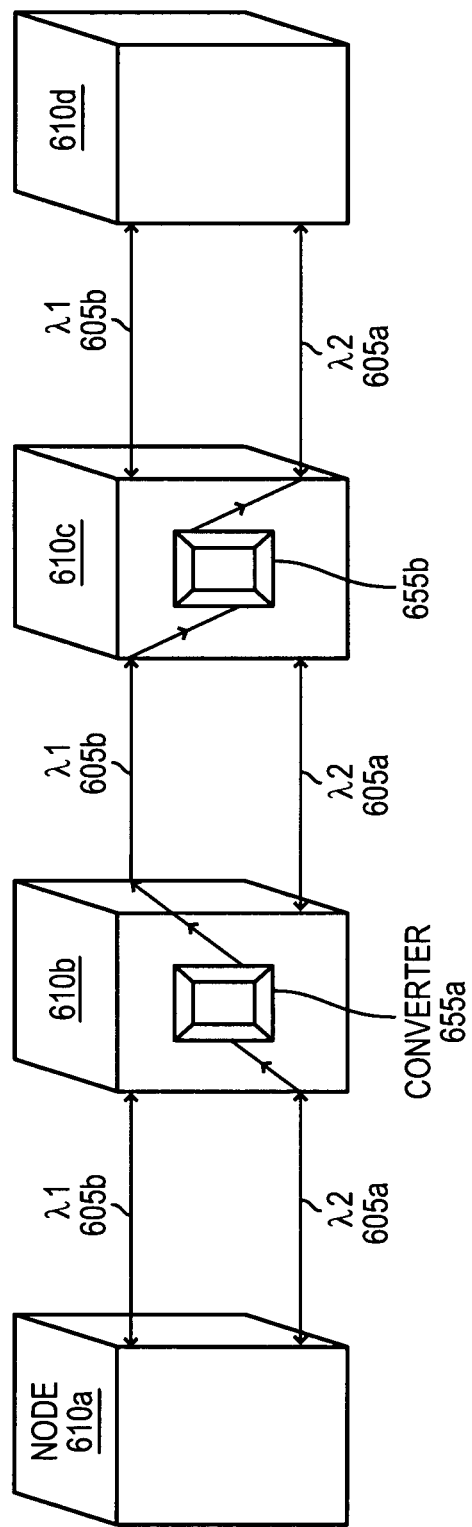
FIG. 6 is a block diagram of multiple nodes of the topology illustrating wavelength interchange along two wavelengths in an example embodiment of the present invention.

FIG. 6 is a schematic diagram illustrating wavelength conversion. Wavelength conversion (interchange) in WMD networks has been proposed to improve efficiency within the network without having to add more fiber-optic links (or other hardware). In some instances, traffic may not be able to be transmitted over a single wavelength for any plurality of reasons. Therefore, in order to transmit the traffic, an embodiment of the present invention allows for a user to choose the nodes that the user wishes traffic to travel to and from, and the example embodiment locates the available paths and the available wavelengths on those paths.

Assuming, only for purposes of this example embodiment of the present invention, the user wants to transmit traffic from node 610a to node 610d, but the example embodiment of the present invention cannot detect any available wavelengths to transmit the entirety of the traffic. This embodiment of the availability determination tool locates different wavelengths that are available to handle the amount of traffic to be transmitted, and then, using a process called wavelength conversion (interchange), allows the traffic to start on a first wavelength 605a, then be converted by a wavelength converter 655a so the traffic can then travel on a second wavelength 605b. In this example embodiment, the traffic must enter a second wavelength converter 655b in order to travel back onto the first wavelength 605a before the traffic can reach the user's chosen destination, e.g., node 610d.

Figure 7A:
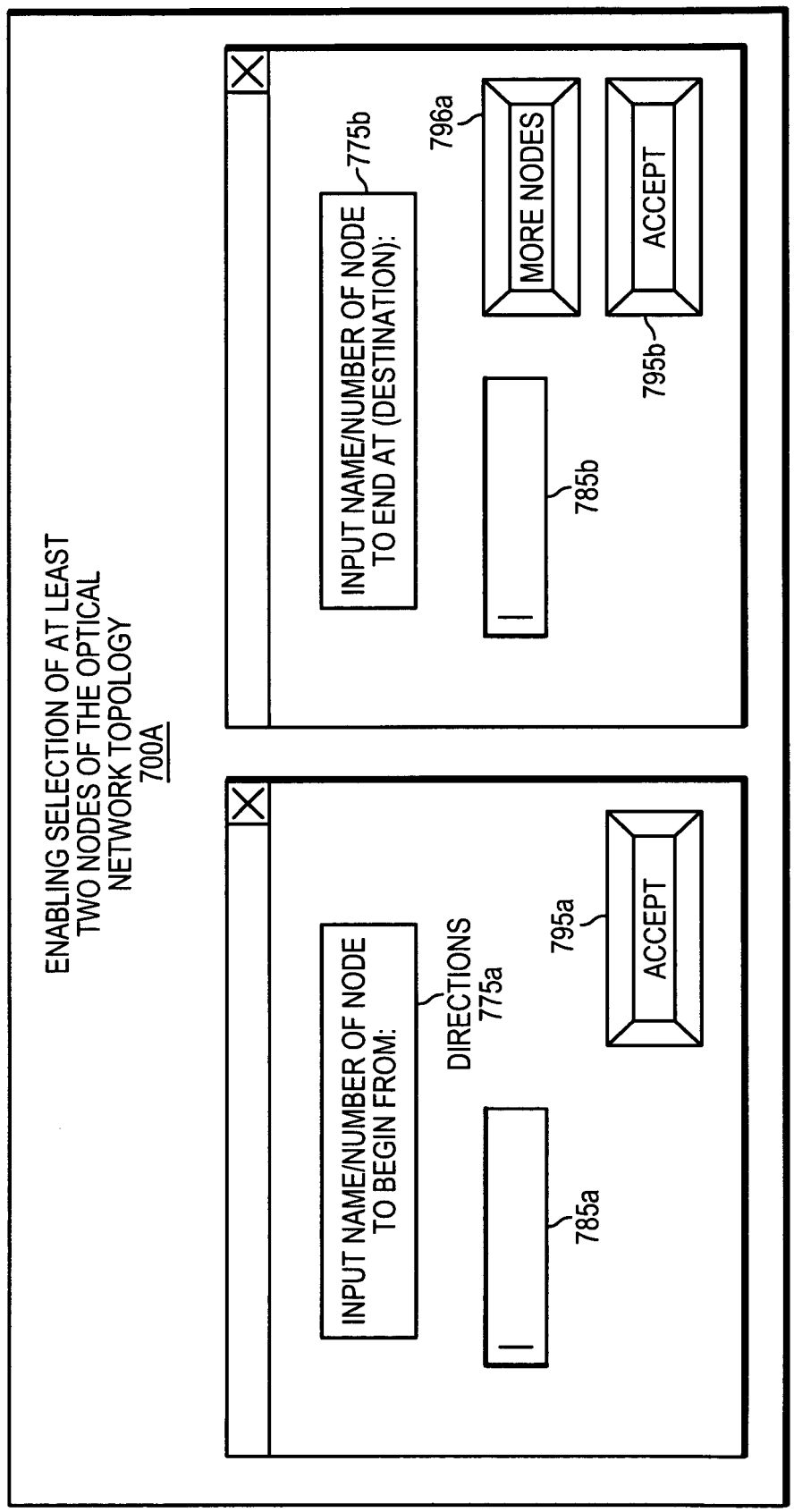
FIG. 7A is an example interface available to a user to enable selection of at least two nodes of a topology.

FIG. 7A illustrates an example embodiment of a user interface according to an example embodiment of the present invention. A user may be prompted, or may request from the availability determination tool, the ability to select at least two nodes of the topology in order for the system to determine what available paths exist between the chosen nodes, and display the findings to the user in either a tabular or graphical format described in more detail below. The tool may prompt the user by displaying a direction or questions 775a to input the name or number (or some other identifier) of a node, into an input box 785a using some method of input known in the art, e.g., a computer keyboard, touch screen technology, voice recognition, or any other suitable input method. The manner in which the tool prompts the user may consist of traditional or proprietary algorithms or user interfaces, or any combination thereof. After the user enters the selection into input box 785a, the user can then accept the information by pressing an accept button 795a. This action is communicated with the tool, and the user is next prompted 775b to input at least a second node of the topology into the input box 785b and again accept the information by pressing the accept button 795b. If the user wants to enter more nodes than at least two, as offered in an embodiment of the present invention, the user may press the additional nodes button 796a, and the tool again continues prompting the user to enter node identifiers until the user chooses to accept the nodes previously entered, the user has identified all nodes on the topology, or some additional action occurs within the tool, or to the tool, to end the input stage.

Once the user concludes entering and answering input for the tool, the user may press an accept button 795c in order to allow the tool to run an algorithm internally to locate, determine, and display available paths between chosen nodes and the available wavelengths and subrate availabilities of those paths in order to be shown to the user, as described in more detail below. The internal algorithms may consist of traditional or proprietary algorithms, or any combination thereof.

Figure 7B:
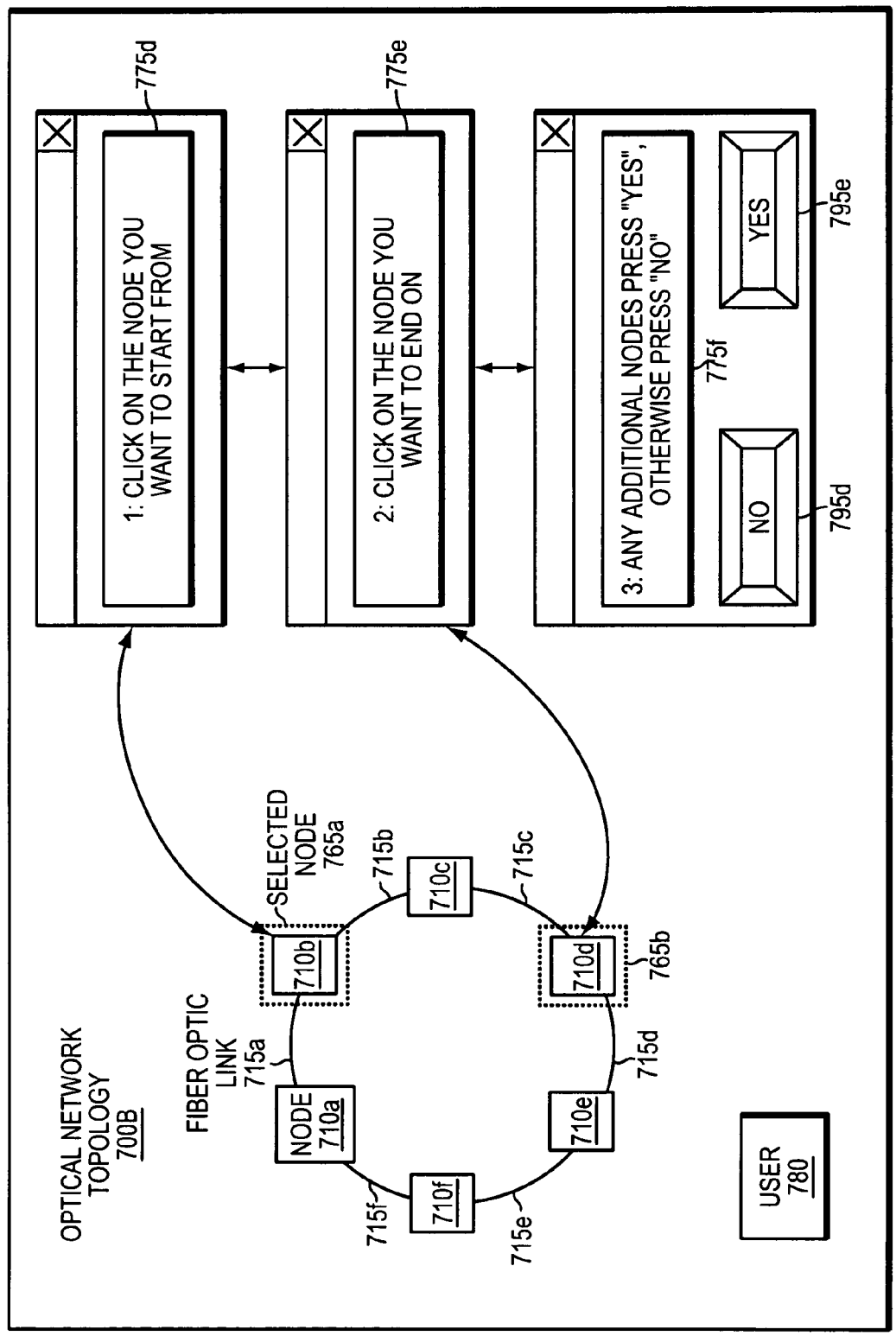
FIG. 7B is an example graphical user interface enabling selection of at least two nodes of the topology and highlighting said nodes.

FIG. 7B illustrates an alternative embodiment of the present invention, which allows a user 780 to select at least two nodes from any of the nodes 710*a-f* connected by the fiber optic links 715*a-f* on an optical network topology 700B, via a graphical user interface. Similarly to the process described above for FIG. 7A, the user 780 may be prompted, or may request from the availability determination tool the ability to select at least two nodes 710*a-f* of the topology 700B in order for the tool to determine what available paths exist between the chosen nodes, and display the findings to the user 780 in either a tabular or graphical format, described in more detail below. The user 780 may be prompted 775*d* by the tool to choose the name or number (or some other suitable identifier) of a node, using some method of input known in the art, e.g., a computer keyboard, touch screen technology, voice recognition, mouse, pointing, algorithm, or some other suitable method for inputting information. After the user 780 selects one of the two nodes from nodes 710*a-f* available on this example embodiment of the network, this action can be communicated with the tool, and the user 780 is next prompted 775*e* to select at least a second node 715*a-f* of the topology using a similar method of selection as described above. If the user 780 wants to enter more nodes 710*a-f* than the two, as offered in this embodiment of the present invention, the user 780 can press the additional nodes button 796*b* and the tool again continues prompting the user 780 to select node 715*a-f* identifiers until the user 780 chooses to accept the nodes previously selected, the user 780 has identified all nodes on the topology 700B, or some additional action occurs within the tool, or to the tool, which ends the selection stage.

Once the user 780 concludes selecting and answering input for the tool, the user 780 can press an accept button 795*d* and allows the tool to run an algorithm internally, or other type of program, that locates, determines, or displays available paths between chosen nodes 710*a-f,* and can further include finding or displaying the wavelength availability and subrate availability of those paths 715*a-f,* in order to be shown to the user 780 as described in more detail below.

Figure 8A:
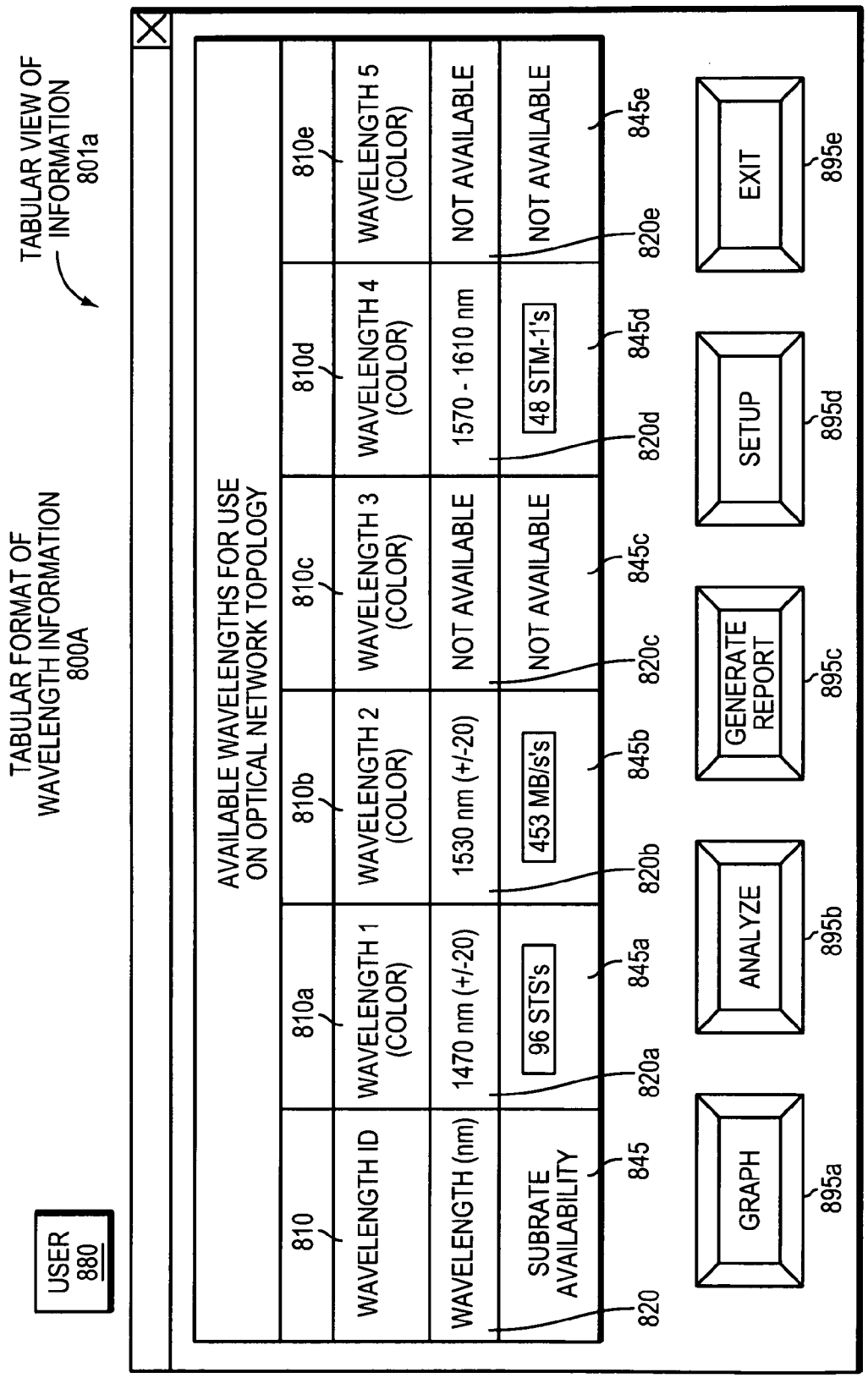
FIG. 8A is an example table reporting wavelength of the wavelengths along a path.

FIG. 8A illustrates an example of a tabular display 801*a* of information on available wavelengths of the topology, where a user 880 requested or selected information on five wavelengths 810*a-e.*

In an embodiment of the present invention, in order for the user 880 to read the table 801*a*, the user 880 can start at a wavelength identifier row, then move down to the row labeled Wavelength (nm) 820 and read entries listed to the right of that row; these entries denote the available wavelengths 820*a-e* in nanometers for the specified wavelength identifiers 810*a-e*. Some embodiments of the present invention may allow the table 801*a* to further include information on subrate availability 845, which informs the user 880 on how much capacity 845*a-e* may be available on a specified wavelength. Typically, availability will include at least unallocated paths through the network that can support traffic demands. An example embodiment of the present invention illustrates that the table 801*a* may include a plurality of buttons 895*a-e* that allow the user 880 to perform a multitude of different tasks associated with this embodiment of the present invention.

Figure 8B:
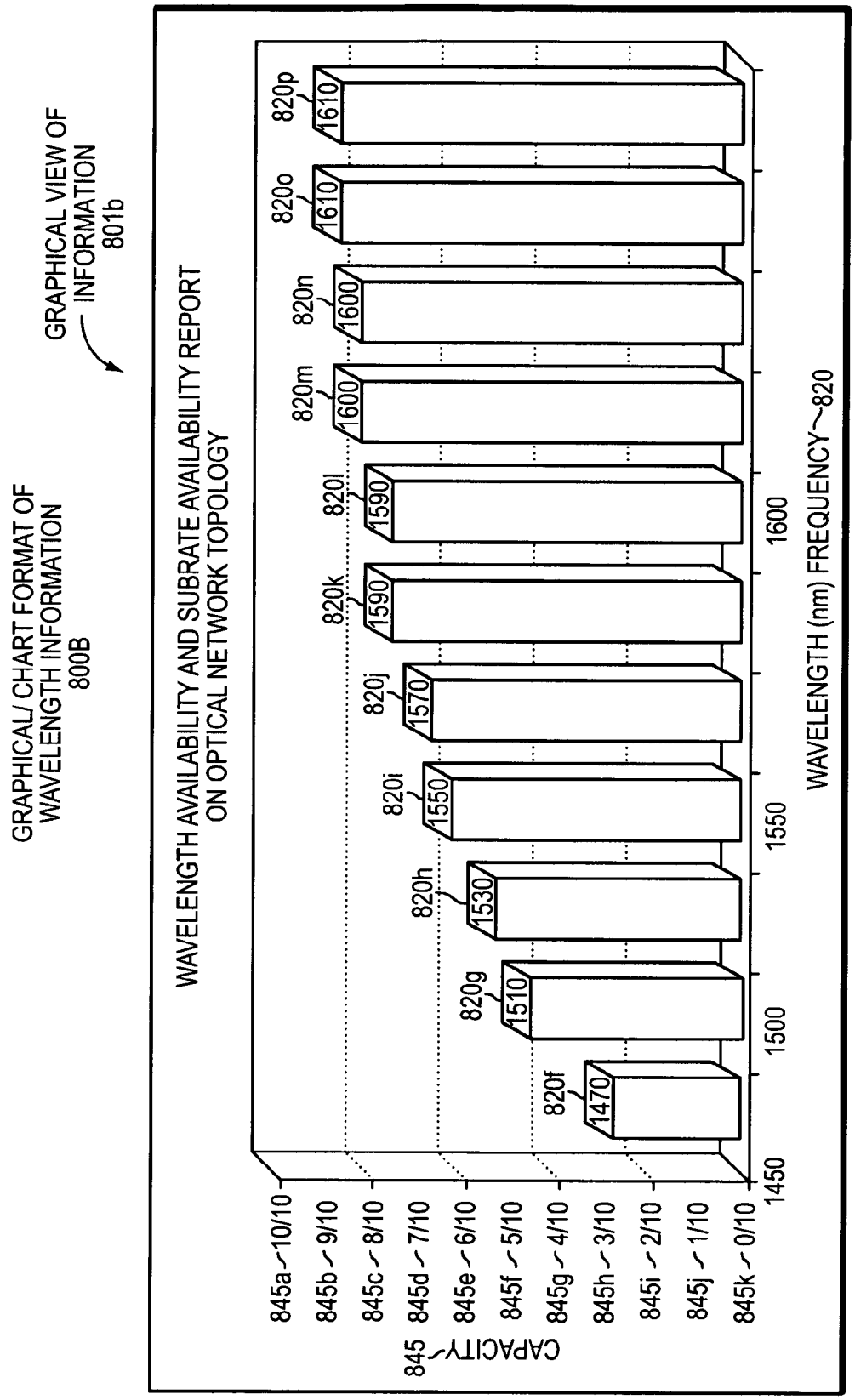
FIG. 8B is a graph displaying the wavelength and subrate availability on the topology in graphical format in an example embodiment of the present invention.

FIG. 8B illustrates the same information as FIG. 8A, but in a graphical representation of an example embodiment of the present invention. Some example embodiments of a graphical view 801*b* allow a user 880 to visualize the wavelength availabilities and the subrate availabilities of those wavelengths in a three-dimensional view. These capabilities of the example embodiment of the present invention are advantageous for a plurality of reasons, including, but not limited to, the possibility that different users may have diverse styles of understanding information, e.g., converging, accommodating, assimilating, diverging, auditory, visual, or tactile, and the ability of an embodiment of the present invention to provide multiple varieties of information display, as opposed to a more simplistic model of information output that may exist, is advantageous.

Figures 2, 9A:
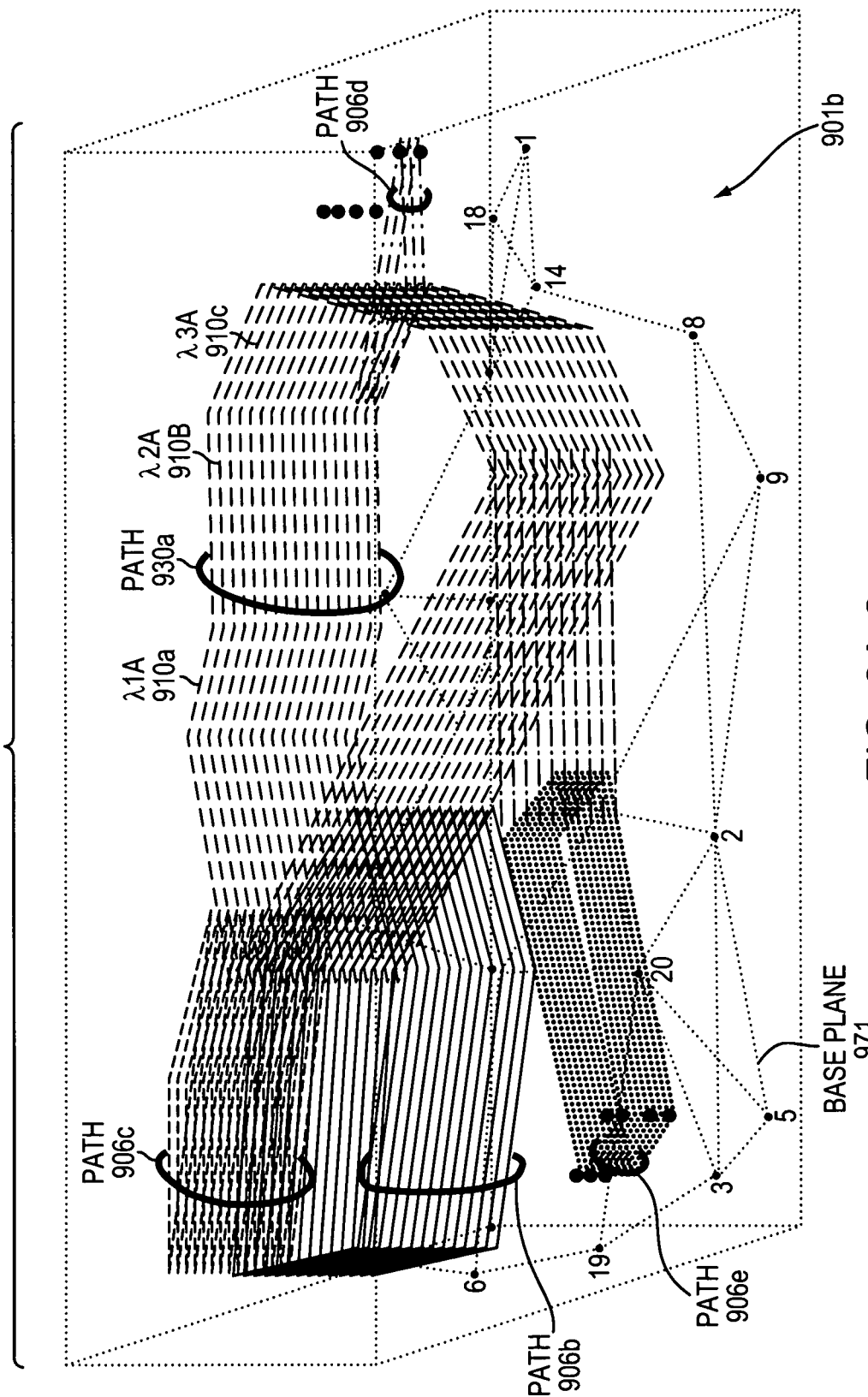

FIGS. 9A-9B are example embodiments of three-dimensional (3-D) visualizations 970 of the present invention's display module 912 for a user 980 to monitor the available wavelengths 905*a-c,* along with the representations of nodes 910*a-j* and physical links 915*a-j,* as part of a 3-D view in respective planes elevated above a base plane 971.

FIG. 9A is an embodiment of the present invention's display module 912A exemplifying a plurality of sub-networks in a 3-D model. The display module 912A displays the representation of nodes and physical links in the base plane 971 of a 3-D view 970. The base plane 971, in this embodiment, consists of nodes 910*a-y* and physical links attaching those nodes 910*a-y.* In the 3-D view 970, the display module 912 displays the available wavelengths in respective planes elevated above the base plane 971. In this embodiment of the present invention, the system groups available wavelengths into sections and provided a visual display of all of the available wavelengths on a given sub-network 906*a-e*. Each level of wavelengths shown in each of the respective sub-networks 906*a-e* represents a 3-D view 970 of the available wavelengths in respective planes.

In FIG. 9A assume, for this example embodiment of the present invention only, that the user 980 previously requested that the system determines all of the available wavelengths on specified sub-networks. In order to receive the 3-D model in FIG. 9A, the user 980 may have requested sub-networks including the following groupings of nodes:

The first sub-network 908*a* contains nodes 910*b,* 910*c,* 910*d,* and 910*y.*

The second sub-network 908*b* contains nodes 910*p,* 910*r,* 910*v,* 910*w,* and 910*x.*

The third sub-network 908*c* contains nodes 910*q,* 910*s,* 910*t,* and 910*u.*

The fourth sub-network 908*d* contains nodes 910*e,* 910*g,* 910*h,* 910*l,* 910*m,* 910*o,* 910*p,* and 910*x.*

The fifth sub-network 908*e* contains nodes 910*h,* 910*i,* and 910*k.*

In this embodiment, the display module 912A displays all of the available wavelengths as part of a 3-D view in respective planes elevated above the base plane 971; this embodiment further displays the wavelength availability along with the representation of nodes 910*a-y* and physical links. Some embodiments of the present invention allow the user 980 to modify the display module 912 to allow for customizable graphics and pictorial 3-D views, which could include different angles, colors, sizes, or any other suitable graphical user interface changes.

In FIG. 9B assume, for this example embodiment of the present invention only, that the user 980 previously requested that the availability determination tool determines a path between two selected nodes, 910*h* and 910*a*. The tool, via the determination module (discussed below in detail) determines the wavelength availability and displays the topology in a 3-D view. The user 980 can read the 3-D representation of nodes 910*a-j* and physical links 915*a-j,* as displayed in the base plane 971 of the 3-D view 970, by starting at node 910*h* and following a path 925 the tool determines. The path 925 uses λ2 905*b* to traverse across three sub-networks within a network 900B by starting at node 910*h,* following the path to node 910*i,* then to node 910*j,* then to node 910*f,* then over a different sub-network to node 910*c,* then to node 910*d,* then to node 910*e*, and stopping at the destination node, e.g., node 910*a*. Hence, in this example embodiment of the present invention, the tool finds the path 925 with an available wavelength 905*b* from node 910*h* to node 910*a* and then displays all of these elements to the user 980 in the 3-D view 970. In this example embodiment, the display module 912 displays the 3-D view 970 of the topology 900B above the base plane 971 of the 3-D view 970. The display module 912 further displays the available wavelengths 905*a-c* as part of the 3-D view 970 in respective planes elevated above the base plane 970.

In some embodiments of the present invention, the user 980 can rotate, spin, change, or otherwise manipulate the display module 912 to change the directionality of the 3-D view 970. In some embodiments, the 3-D view 970 can be customizable according to the user's 980 preferences or capabilities; such as, different graphical user interfaces, viewing capabilities, or other such differences in the art that can affect the 3-D view 970.

Figure 10:
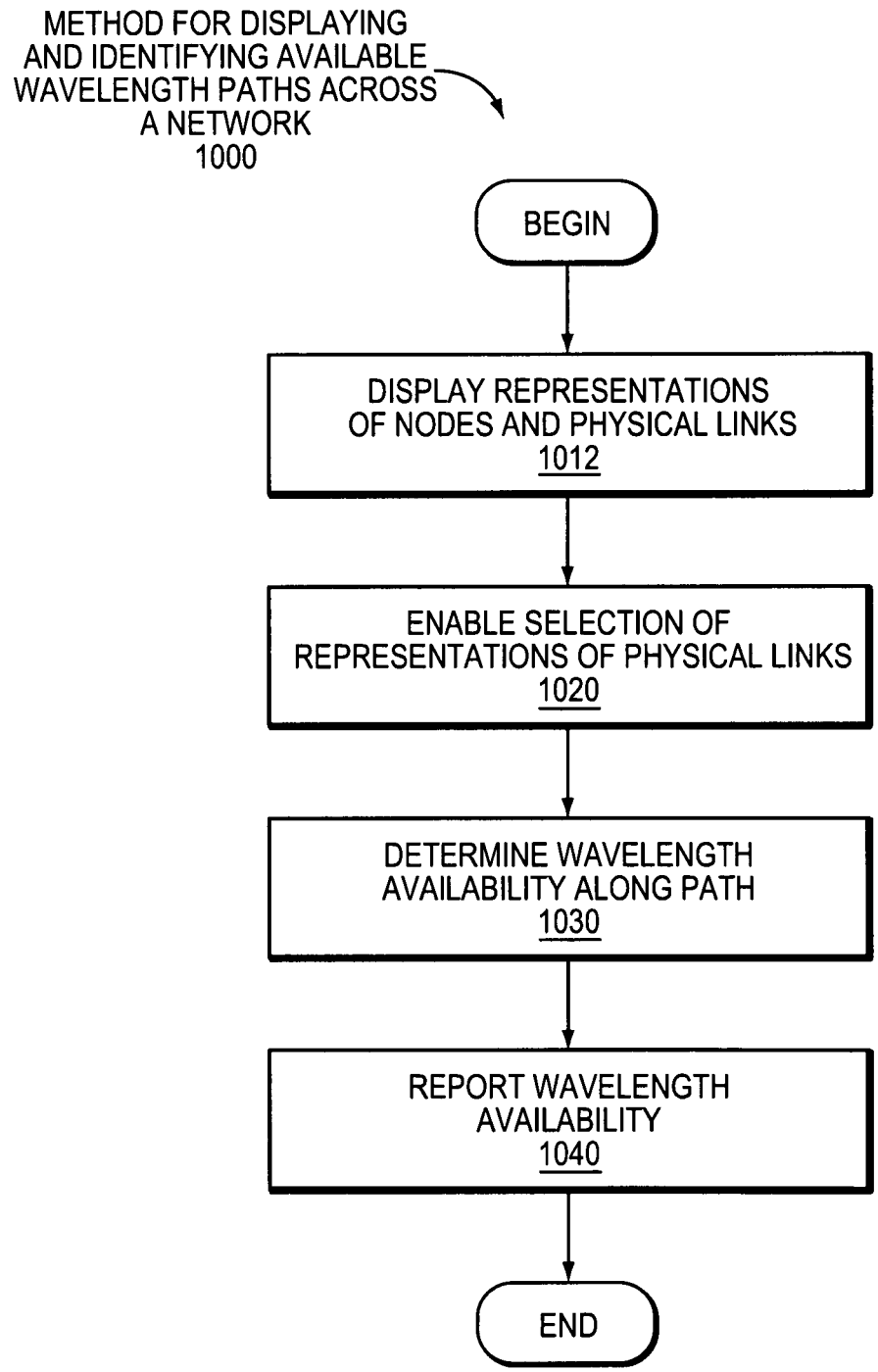
FIGS. 10, 11, 12, and 13 are flow diagrams representative of example methods of providing wavelength availability in an optical network topology.

FIG. 10 is a flow chart that illustrates an example method for displaying and identifying available wavelengths across a topology 1000 according to the disclosed availability determination tool. Wavelength determination begins with the user accessing a display module 1010, which displays representations of nodes and physical links of the topology. A representation of nodes and physical links of the topology could be a graphic image displayed to the user via any suitable graphical user interface.

After the user accesses the display module, an example embodiment of the present invention prepares an enabling module 1020, which enables selection of the representation of the physical links to form a path through the topology. In some embodiments, the enabling module 1020 can display to the user a tabular, graphical, pictorial format, or a combination of these formats, in order for the user to select a specific path, or multiple paths. Next, the availability determination tool accesses, or allows the user to access, a determination module 1030. The determination module 1030 determines the wavelength availability along the user specified paths selected, through the enabling module 1020.

After the determination module 1030 establishes the wavelength availability along specified paths, the availability determination tool accesses, or allows the user to access, a reporting module 1040. The reporting module 1040 reports the wavelength availability of at least a subset of the wavelengths along the specified paths. The reporting module 1040 can display to the user a tabular, graphical, pictorial format, or a combination of these formats, in order for the user to visualize or receive reports of wavelength availability.

Figure 11:
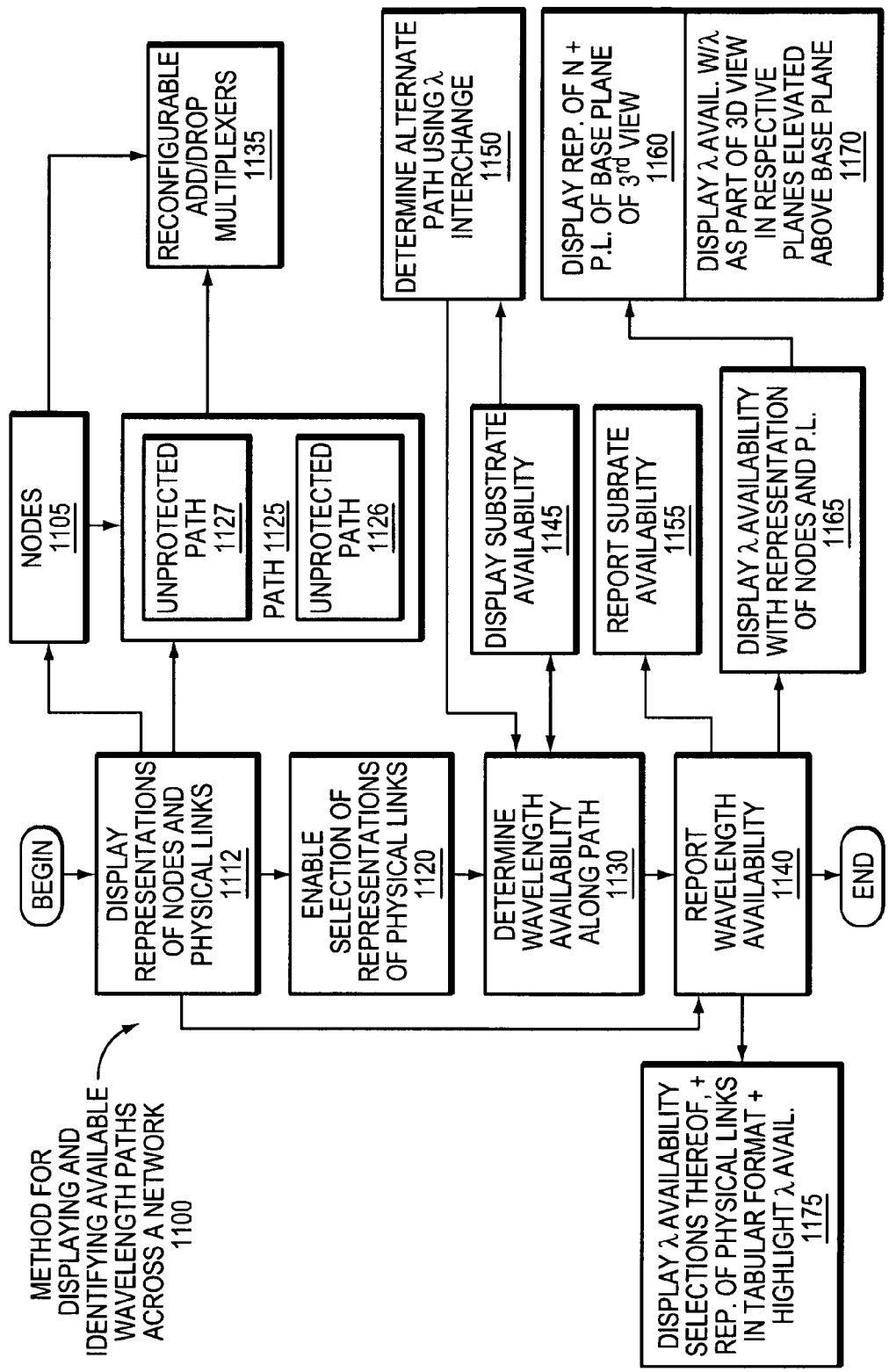

FIG. 11 is a flow chart that illustrates a second example method of the present invention, which displays and identifies available wavelengths across a topology 1100, according to the disclosed availability determination tool. As in the example embodiment illustrated in FIG. 10, determination begins with accessing a display module 1112, the display module discloses a representation of nodes and physical links of the topology. The network topology may be a ring, mesh, hybrid ring/mesh, RPR (packet), or any other suitable topology. The network topology may contain multiple network elements that can include a representation of nodes, a representation of physical links, a plurality of paths, and other elements used in the provisioning of topology services. The physical links form a path 1125 through the topology connecting a plurality of nodes 1105 on the network. The path 1125 created by the physical links can include at least two forms, a protected path 1126 or an unprotected path 1127.

The nodes 1105 existing of the topology can be reconfigurable; that is, the nodes 1105 can be used to selectively reconfigure the optical interconnections associated with the network paths. This reconfiguration may be in the optical domain and may be achieved through the use of ROADMs 1135. Additionally, the nodes 1105 of the network may include add/drop ports that are used for adding or dropping wavelengths to and from the network. This example embodiment of a method of the present invention allows the user to view the displayed topology, which can include any or all of the above mentioned network elements.

Next, the system accesses, or allows a user 1180 to access, an enabling module 1120 in order for the user 1180 to select the physical links of the topology, via a suitable form of input. Once the user 1180 makes a selection, the availability determination tool accesses a determination module 1130. The determination module 1130 determines wavelength availability along the selected paths 1125. The determination module 1130 can further determine the subrate availability 1145 of a wavelength; this information enables the user 1180 to know if a wavelength is being used to its full capacity, or if the wavelength is only being partially used and may be able to transmit more traffic to or from different nodes. The determination module 1130 can further determine alternative paths 1125 using wavelength interchange 1150 to reroute wavelengths to change the wavelength availability. In some embodiments of the present invention, the user 1180 can use the availability determination tool to find a path 1125 from one node 1105 to another node 1105 that must use one or more wavelengths. The wavelength interchange 1150 determines the different wavelengths within a particular network or sub-network necessary to transmit the traffic to the selected destination.

The user 1180 can then use the availability determination tool to view the information in a reporting module 1140. The reporting module 1140 reports the wavelength availability and the subrate availability 1155 by further configuring the display module 1112 to display the representation of nodes and physical links 1165 in a base plane 1170 of a three-dimensional view 1160. In an example embodiment of the present invention, the tool enables user 1180 to view a display of the wavelength availability, along with the topology in the three-dimensional view. Where the available wavelengths display in respective planes elevated above the base plane 1170.

In some embodiments, the reporting module 1140 can include elements such as the representations of physical links of the topology, selections thereof, the wavelength availability, or any other suitable elements that the system can report to the user 1180. The reporting module 1140 can further allow the user 1180 to view the elements of the reporting module 1140 in a tabular format and highlight the wavelength availability 1175. In some embodiments, the user 1180 can view the elements of the reporting module 1140 in a pictorial, graphical, tabular format, any combination thereof, or any suitable format to view information.

Figure 12:
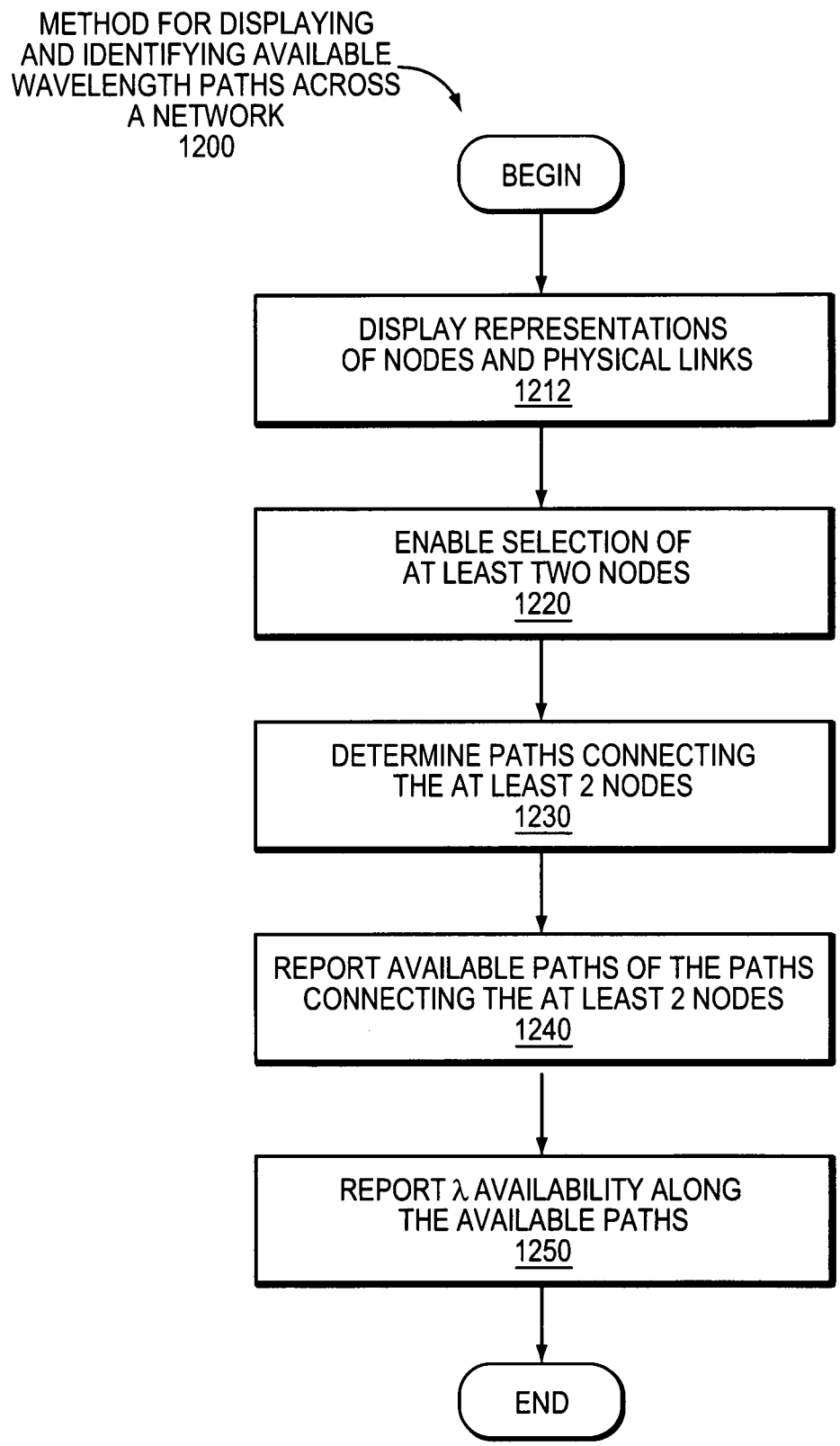

FIG. 12 is a flow chart that illustrates a third example embodiment of a method of the present invention that displays and identifies available wavelengths across a topology 1200, according to the disclosed availability determination tool. Wavelength determination begins where the user accesses a display module 1212 that displays representations of nodes and physical links of the topology 1200. A representation of nodes and physical links of the topology 1200 can include a graphic image displayed to the user via any suitable graphical user interface.

After the user accesses the display module, an example embodiment of the present invention prepares an enabling module 1220 that enables selection of at least two nodes of the topology 1200. In some embodiments, the enabling module 1220 can display to the user a tabular, graphical, pictorial format, or a combination of these formats, in order for the user to select a specific path, or multiple paths. Next, the availability determination tool accesses, or allows the user to access, a determination module 1230. The determination module 1230 determines paths connecting at least two nodes of the topology 1200, selected by the user; this module 1230 further determines wavelength availability along the paths. In an example embodiment, the determination module 1230 allows the system to consider any or all of the possible wavelengths that are connected to the specified nodes, and then determines the availability of each of those wavelengths in order to determine for the user which wavelengths are available to transmit traffic to or from the specified nodes.

Next, the availability determination tool accesses, or allows the user to access a reporting module 1240, which reports the available paths of the paths connecting at least two nodes, and reports the available paths having at least one available wavelength and the wavelength availability along the available paths 1241. In some embodiments of the present invention, the reporting module 1240 can display to the user a tabular, graphical, pictorial format, or a combination of these formats, in order for the user to visualize or receive reports of wavelength availability.

Figure 13:
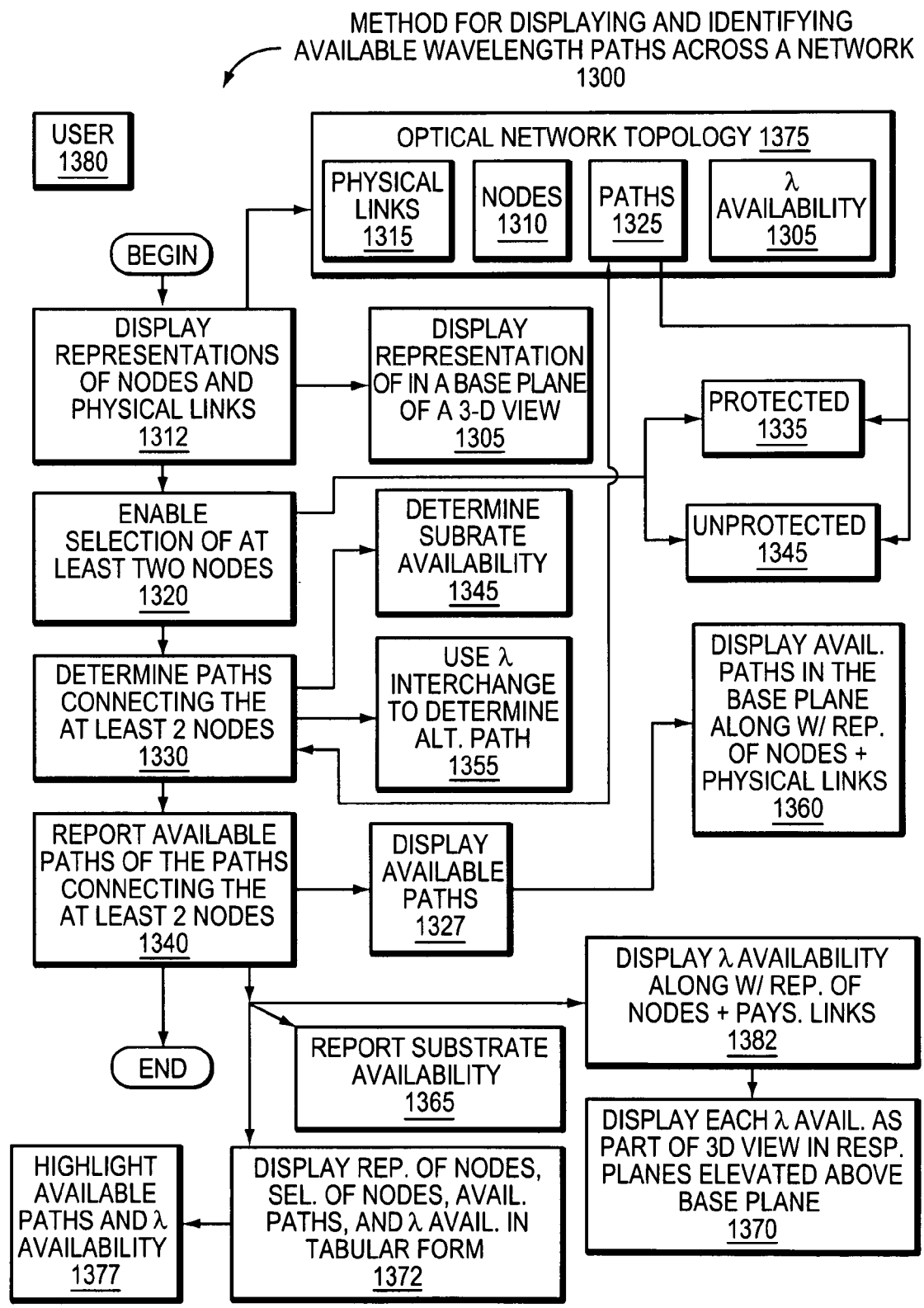

FIG. 13 is a flow chart that illustrates a fourth example embodiment of a method 1300 that displays and identifying available wavelengths across a topology 1375, according to the disclosed availability determination tool. As in the embodiment illustrated in FIG. 11, the display module 1312 of this example embodiment performs in substantially the same method as display module 1112.

Next, an enabling module 1320, enables a user 1380 to input information (viewed from the display module 1312) by selecting at least two nodes 1310 of the topology 1375. The enabling module 1320 can further include physical links 1315 to form paths 1325 that can be a protected path 1360 or an unprotected path 1365 through the topology 1375.

Next, a determination module 1330 determines paths 1325 that connect the nodes 1310, and further determines the wavelength availability 1305 along the paths 1325. The determination module 1330 can further determine the subrate availability 1345 and transmit that availability information to the reporting module 1340. The determination module 1330 further includes a wavelength interchange module 1355, which determines alternative paths using wavelength conversion to reroute wavelengths, thereby changing the wavelength availability.

Next, a reporting module 1340 enables the user 1380 to view the information that an embodiment of the present invention processes, by reporting the available paths 1325 of the paths that include connecting the specified nodes 1310, and of the available paths 1325, having at least one available wavelength. The reporting module 1340 further reports the available paths 1325 and the display module 1312 displays the available paths 1325, along with the topology 1375 and the wavelength availability 1305. Some embodiments of the present invention can include a reporting module 1340 that can further configure the display module 1312 to display the entire topology 1375 and the available paths 1325 in a base plane of a three-dimensional view 1370. The display module 1312 further displays the wavelength availability 1305 in the three-dimensional view 1370, with each available wavelength represented in a respective plane elevated above the base plane.

The reporting module 1340 can further report any, all, or some appropriate combination of elements, which are determined by an embodiment of the present invention, in a tabular format 1372 that could include highlighting the wavelength availability 1377. In some embodiments of the present invention, the reporting module 1340 can display to the user 1380 a tabular 1372, graphical, pictorial format, or a combination of these formats, in order for the user 1380 to visualize or receive reports of wavelength availability, or any other suitable elements.

Figure 14:
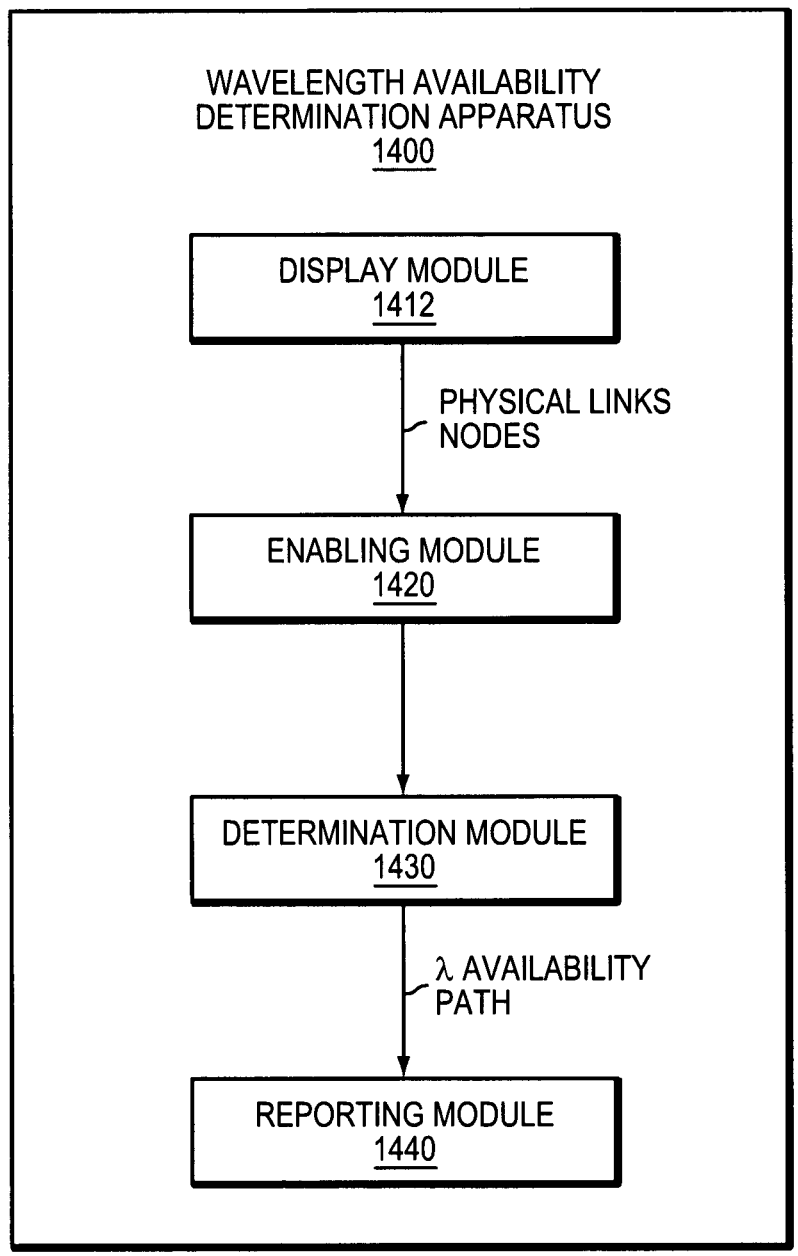
FIGS. 14, 15, 16, and 17 are block diagrams of an apparatus to provide wavelength availability in an optical network topology.

FIG. 14 is a block diagram that illustrates an example embodiment of a wavelength availability determination apparatus 1400, according to the disclosed availability determination tool. The apparatus models the topology, such as the one shown in FIG. 3, to provide the availability of wavelengths in the topology. The apparatus 1400 includes a display module 1412, an enabling module 1420, a determination module 1430, and a reporting module 1440. The display module 1412 displays a representation of nodes and physical links of the topology; the enabling module 1420 enables selection of the representation of physical links to form a path through a network; the determination module 1430 determines wavelength availability along the path; and the reporting module 1440 reports the wavelength availability determined along the path.

Figure 15:
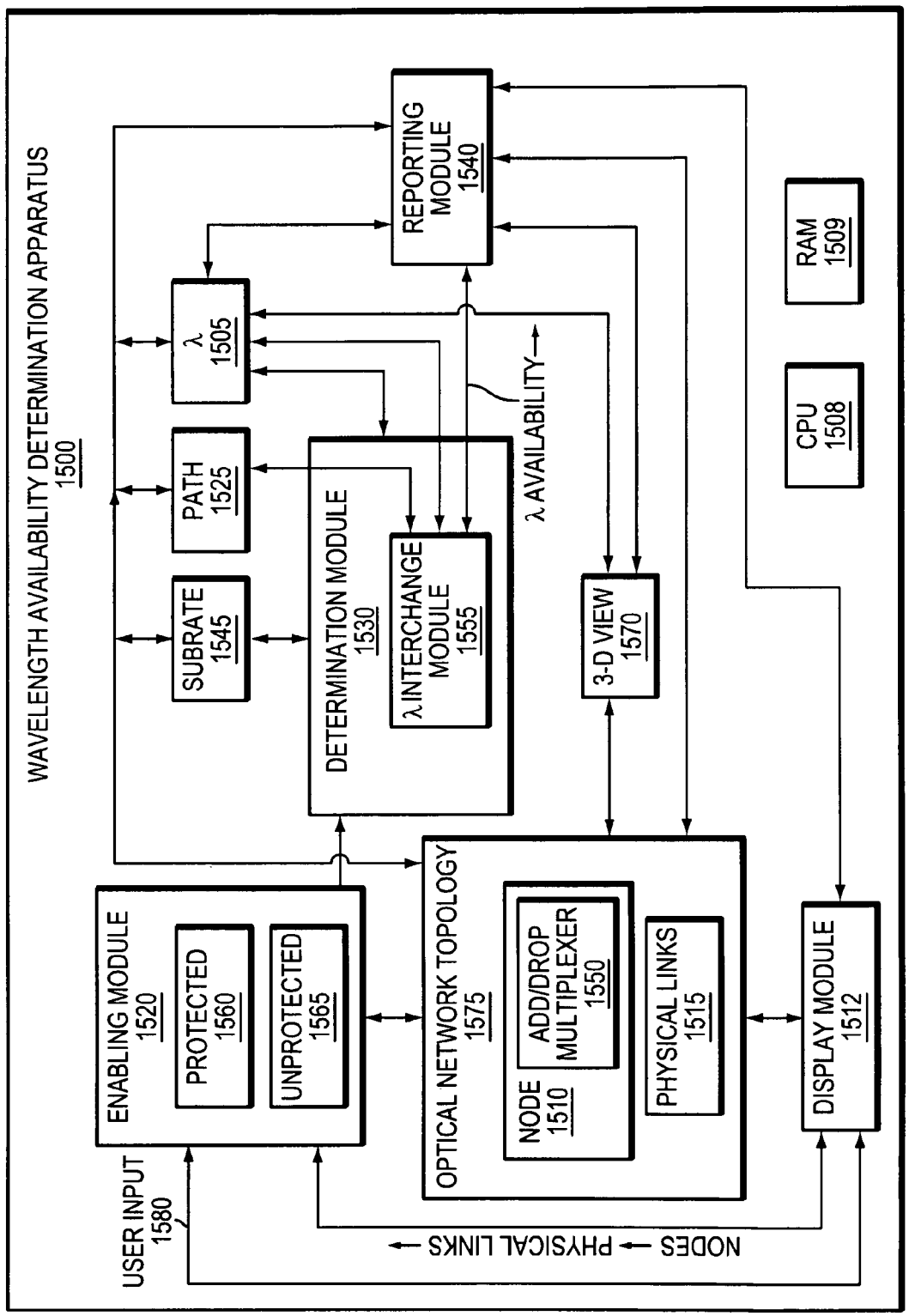

FIG. 15 is a block diagram that illustrates a second example embodiment of a wavelength availability determination apparatus 1500, according to the disclosed availability determination tool. Like the example shown in FIG. 14, the apparatus 1500 includes a display, an enabling, a determination, and a reporting module 1512, 1520, 1530, 1540, which can be controlled by a central processing unit (CPU) 1508 operating in conjunction with random access memory (RAM) 1509. In the apparatus 1500, the display module 1512 displays to a user 1580 representations of nodes 1510 and physical links 1515 of a topology 1575. In an example embodiment of the present invention, the nodes 1510 could include at least one ROADM 1550.

Next, the enabling module 1520, enables the user 1580 to input information (viewed from display module 1512) by selecting from the representation of the physical links 1515 to form a path 1525 through the topology 1575. The enabling module 1520 can further include physical links 1515 to form paths 1525, which can be a protected path 1560 or an unprotected path 1565 through the topology 1575.

Next, a determination module 1530, determines wavelength availability 1505 along the path 1525 and a subrate availability 1545, and provides this information to a reporting module 1540, as described below in more detail. The determination module 1530 can further include a wavelength interchange module 1555, which allows the system to redirect, deflect, switch, or reroute a wavelength in order to change the wavelength availability in a network or sub-network.

Next, the reporting module 1540 enables the user 1580 to view the information that an embodiment of the present invention processes, by configuring the display module 1512 to display the wavelength availability 1505 of at least a subset of the wavelengths along the path 1525. In an embodiment of the present invention, the reporting module 1540 receives the determinations regarding wavelength availability 1505 along the path 1525 and the subrate availability 1545 from the determination module 1530 (as described above) and reports the information in the report of the wavelength availability. The reporting module 1540 can further display the wavelength availability 1505 and configure the display module 1512 to display the representation of a node 1510 and a physical link 1515 of the topology 1575.

In an example embodiment of the apparatus 1500, the reporting module 1540 can further configure the display module 1512 to display the representation of a node 1510 and a physical link 1515 in a base plane of a 3-D view 1570. Further, the display module 1512 displays the available wavelengths as part of the 3-D view 1570 in respective planes elevated above the base plane. In some embodiments of the present invention, the reporting module 1540 can further configure the display module 1512 to display elements of the determination module 1530 in a tabular format, which could include highlighting the wavelength availability. In some embodiments, the elements of the determination can include any of the subrate availability 1545, the paths 1525, the wavelength availability 1505, the nodes and physical links 1515 of the topology 1575, or any other suitable elements that can be determined by the availability determination tool. In some embodiments of the present invention, the reporting module 1540 can display to the user 1580 a tabular, graphical, pictorial format, or a combination of these formats, in order for the user 1580 to visualize or receive reports of the wavelength availability, or any other suitable elements.

Figure 16:
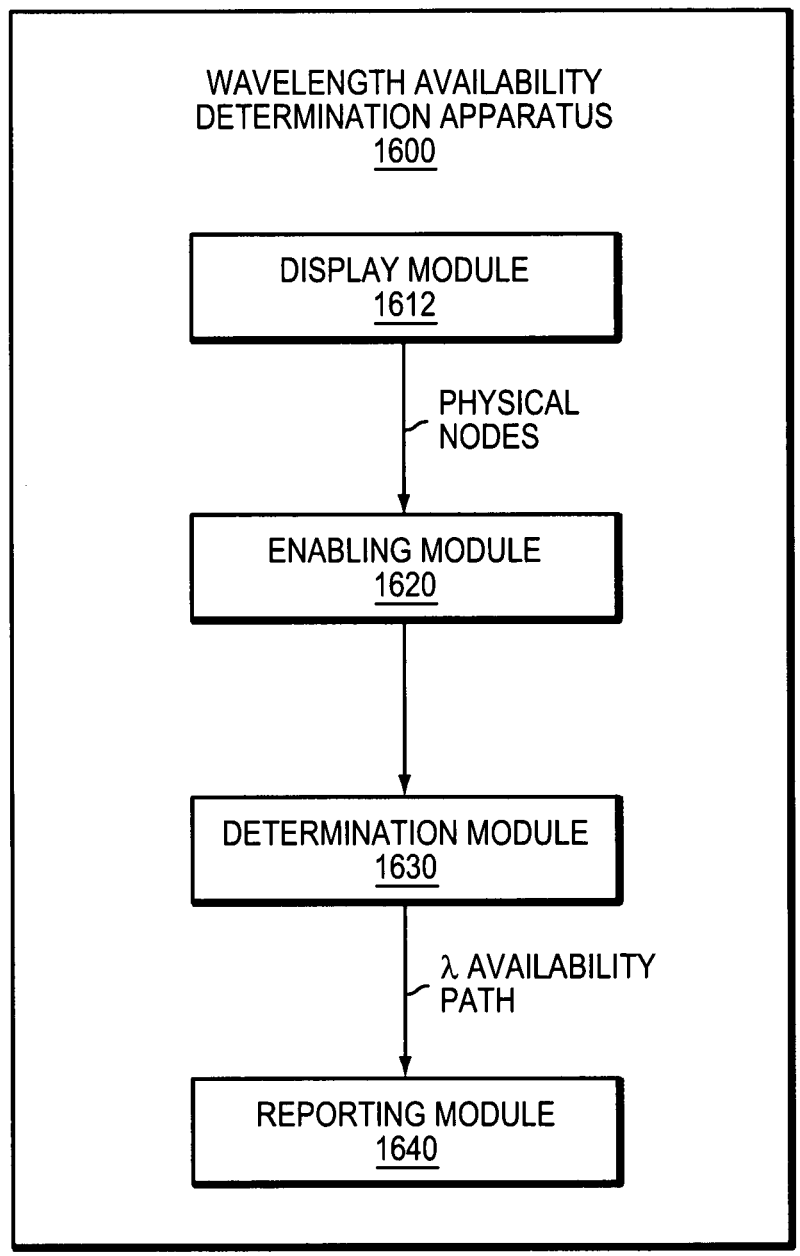

FIG. 16 is a block diagram, similar to FIG. 14, which illustrates a third example embodiment of a wavelength availability determination apparatus 1600, according to the disclosed determination tool. This example embodiment of an apparatus models a topology, such as the one shown in FIG. 3, and provides the availability of wavelengths in the topology. The apparatus 1600 includes a display module 1612, an enabling module 1620, a determination module 1630, and a reporting module 1640. The display module 1612 displays a representation of nodes and physical links of the topology; the enabling module 1620 enables selection of at least two nodes of the topology; the determination module 1630 determines paths connecting at least two nodes through the topology, as well as, the wavelength availability along the paths; and the reporting module 1640 reports available paths of the paths connecting at least two nodes and the wavelength availability along the available paths.

Figure 17:
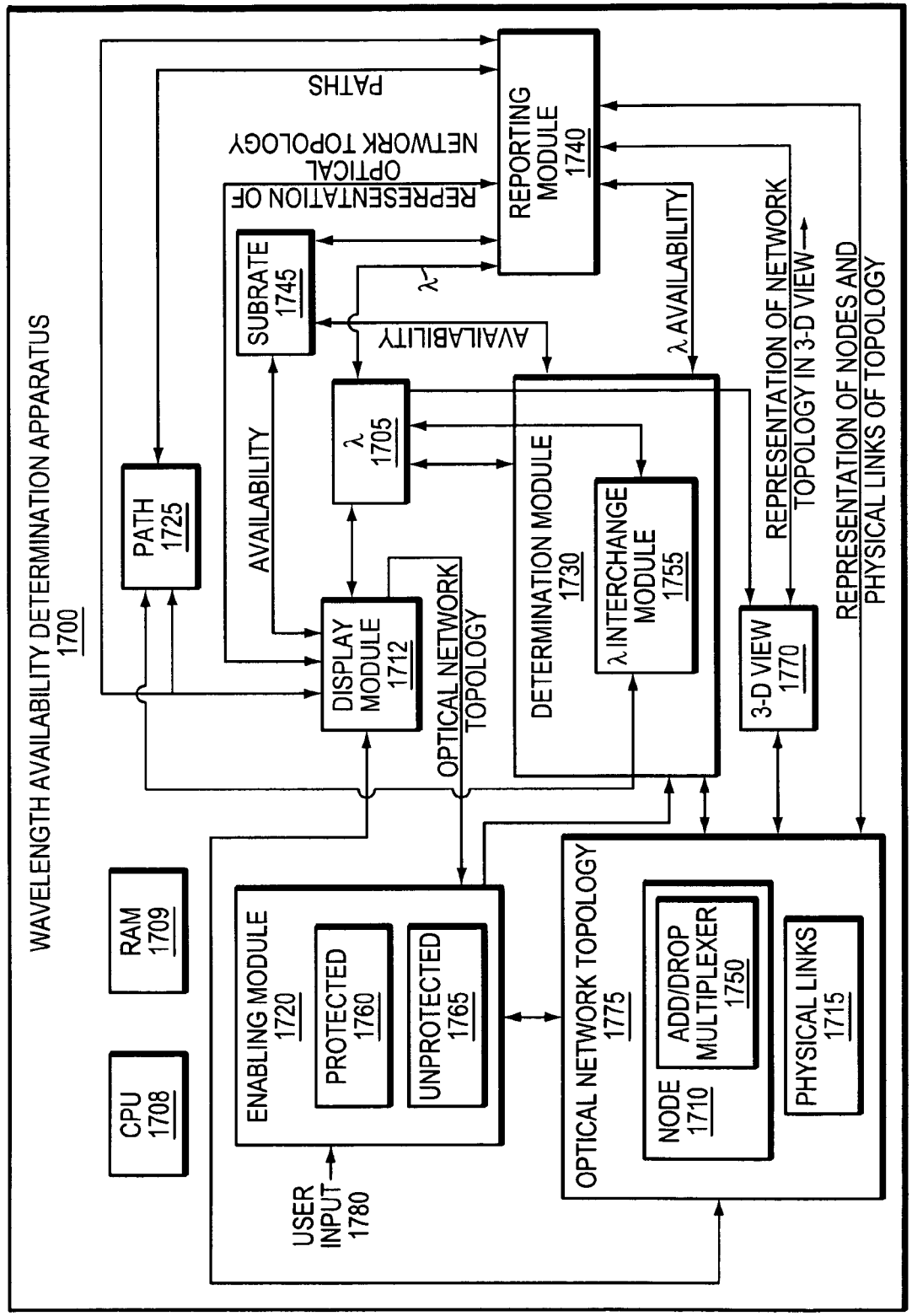

FIG. 17 is a block diagram, similar to FIG. 15, which illustrates a fourth example embodiment of a wavelength determination apparatus 1700, according to the disclosed determination tool. This example embodiment of an apparatus models a topology 1775, such as the one shown in FIG. 3, and provides the availability of wavelengths, and other suitable elements as described above, in the topology 1775. Like the example shown in FIG. 16, the apparatus 1700 includes the a display, an enabling, a determination, and a reporting module 1712, 1720, 1730, 1740, which can be controlled by a central processing unit (CPU) 1708 operating in conjunction with random access memory (RAM) 1709.

In an embodiment of the present invention, in the apparatus 1700, the display module 1712 displays to a user 1780 representations of nodes 1710 and physical links 1715 of the topology 1775, where the nodes 1710 could include at least one ROADM 1750. Next, the enabling module 1720, enables the user 1780 to input information (viewed from the display module 1712) by selecting at least two nodes 1710 of the topology 1775. The enabling module 1720 can further include physical links 1715 to form paths 1725, which can be a protected path 1760 or an unprotected path 1765 through the topology 1775.

Next, the determination module 1730 determines paths 1725 that include connecting at least two nodes 1710 and determines the wavelength availability 1705 along the paths 1725. The determination module 1730 can further determine the subrate availability 1745. The determination module 1730 can further send the subrate availability 1745 information to the reporting module 1740. The determination module 1730 can further include a wavelength interchange module 1755, which determines alternative paths 1725 using wavelength interchange to reroute wavelengths, thereby changing the wavelength availability.

Next, the reporting module 1740 enables the user 1780 to view the information that an embodiment of the present invention processes, by reporting the available paths 1725 of the paths that include connecting at least two nodes 1710 and of the available paths 1725, having at least one available wavelength. The reporting module 1740 can further report the available paths 1725 and configure the display module 1712 to display the available paths, 1725 along with the topology 1775, and display the wavelength availability 1705.

An embodiment of the present invention can include a reporting module 1740 that can further configure the display module 1712 to display the entire topology 1775 and the available paths 1725 in a base plane of a three-dimensional view 1770. The display module 1712 further displays the wavelength availability 1705 in the three-dimensional view 1770, with each available wavelength represented in a respective plane elevated above the base plane. The reporting module 1740 further reports any, all, or some appropriate combination of elements that are determined by an embodiment of the present invention, in a tabular format that can include highlighting the wavelength availability. In some embodiments of the present invention, the reporting module 1740 can display to the user 1780 a tabular, graphical, pictorial format, or a combination of these formats, in order for user 1780 to visualize or receive reports of wavelength availability or any other suitable elements.

It should be understood that the examples presented herein can include more or fewer components, be partitioned into subunits, or be implemented in different combinations. Moreover, the flow and block diagrams of FIGS. 10-17 may be implemented in at least hardware, firmware, or software. If implemented in software, the software may be written in any suitable software language. The software may be embodied on any form of computer readable medium, such Random Access Memory (RAM), Read-Only Memory (ROM), magnetic or optical disk, or any other tangible embodiment, and loaded and executed by generic or custom processor(s).

While this invention has been particularly shown and described with references to example embodiments thereof, it will be understood by those skilled in the art that various changes in form and details may be made therein without departing from the scope of the invention encompassed by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method of providing wavelength availability in an optical network topology, the method comprising:
   displaying representations of nodes and physical links of the optical network topology;
   enabling selection of the representations of the physical links to form a path through the optical network topology;
   determining wavelength availability along the path; and
   reporting the wavelength availability of at least a subset of the wavelengths along the path.

2. A method as in claim 1 wherein determining wavelength availability includes determining subrate availability; and
   wherein reporting the wavelength availability includes reporting the subrate availability.

3. A method as in claim 2 further including:
determining an alternate path using wavelength interchange to reroute wavelengths to change the wavelength availability.

4. A method as in claim 1 wherein reporting the wavelength availability includes displaying the wavelength availability along with the representations of nodes and physical links of the optical network topology.

5. A method as in claim 4 wherein displaying the representations of nodes and physical links includes displaying the representations of nodes and physical links in a base plane of a three-dimensional view; and
wherein displaying the wavelength availability along with the representations of nodes and physical links includes displaying the available wavelengths as part of the three-dimensional view in respective planes elevated above the base plane.

6. A method as in claim 1 wherein reporting the wavelength availability includes displaying the representations of physical links of the optical network topology, selections thereof, and the wavelength availability in a tabular format and highlighting the wavelength availability.

7. A method as in claim 1 wherein the representations of nodes include representations of reconfigurable optical add/drop multiplexers.

8. A method as in claim 1 wherein the path is a protected path.

9. A method as in claim 1 wherein the path is an unprotected path.

10. The method of claim 1 further comprising:
determining available paths connecting the at least two nodes through the optical network topology; and
reporting the available paths and reporting the wavelength availability along the available paths.

11. The method of claim 10 wherein reporting the available paths includes displaying the available paths along with the representations of nodes and physical links of the optical network topology; and
wherein reporting the wavelength availability includes displaying the wavelength availability along with the representations of nodes and physical links of the optical network topology.

12. The method of claim 11 wherein displaying the representations of nodes and physical links includes displaying the representations of nodes and physical links in a base plane of a three-dimensional view;
wherein displaying the available paths along with the representations of nodes and physical links includes displaying the available paths in the base plane along with the representations of nodes and physical links; and
wherein displaying the wavelength availability along with the representations of nodes and physical links includes displaying each available wavelength as part of the three-dimensional view in respective planes elevated above the base plane.

13. An apparatus for providing wavelength availability in an optical network topology, the apparatus comprising:
a display module configured to display representations of nodes and physical links of the optical network topology;
an enabling module configured to enable selection of the representations of the physical links to form a path through the optical network topology;
a determination module configured to determine wavelength availability along the path; and
a reporting module configured to report the wavelength availability of at least a subset of the wavelengths along the path.

14. The apparatus as in claim 13 wherein the determination module is further configured to determine the availability of a wavelength, including subrate availability within the wavelength; and
wherein the reporting module is further configured to report the subrate availability.

15. The apparatus as in claim 14 further including a wavelength interchange module configured to use wavelength interchange to reroute a wavelength; and
wherein the determination module is further configured to cause the wavelength interchange module to change the wavelength availability in the optical network topology.

16. The apparatus as in claim 13 wherein the reporting module causes the display module to display the wavelength availability along with the representations of nodes and physical links of the optical network topology.

17. The apparatus as in claim 16 wherein the display module is further configured to display the representations of nodes and physical links in a base plane of a three-dimensional view; and
wherein the reporting module causes the display module to display the wavelength availability as part of the three-dimensional view in respective planes elevated above the base plane.

18. The apparatus as in claim 13 wherein the reporting module causes the display module to display the representation of physical links of the optical network topology, selections thereof, and the wavelength availability in a tabular format and highlight the wavelength availability.

19. The apparatus as in claim 13 wherein the representations of nodes include representations of reconfigurable add/drop multiplexers.

20. The apparatus as in claim 13 wherein the path is a protected path.

21. The apparatus as in claim 13 wherein the path is an unprotected path.

22. The apparatus as in claim 13 wherein the reporting module is further configured to cause the display module to display the available paths along with the representations of nodes and physical links of the optical network topology; and
wherein the reporting module is further configured to cause the display module to display the wavelength availability along with the representations of nodes and physical links of the optical network topology.

23. The apparatus as in claim 13 wherein:
the display module is further configured to display the representations of nodes and physical links in a base plane of a three-dimensional view;
the reporting module is further configured to cause the display module to display the available paths in the base plane along with the representations of nodes and physical links; and
the reporting module is further configured to cause the display module to display each available wavelength as part of the three-dimensional view in respective planes elevated above the base plan.

24. A computer readable medium having computer readable program codes embodied therein for providing wavelength availability in an optical network topology, the computer readable medium program codes including instructions that, when executed by a processor, cause the processor to:
display representations of nodes and physical links of the optical network topology;

enable selection of the representations of the physical links to form a path through the optical network topology;
determine wavelength availability along the path; and
report the wavelength availability of at least a subset of the wavelengths along the path.

25. A method of providing wavelength availability in an optical network topology, the method comprising:
displaying representations of nodes and physical links of the optical network topology;
enabling selection of at least two nodes of the optical network topology;
determining paths connecting the at least two nodes through the optical network topology;
determining wavelength availability along the paths;
reporting available paths of the paths connecting the at least two nodes, the available paths having at least one available wavelength; and
reporting the wavelength availability along the available paths.

26. A method as in claim 25 wherein determining wavelength availability includes determining subrate availability; and
wherein reporting the wavelength availability includes reporting the subrate availability.

27. A method as in claim 26 further including:
determining alternative paths using wavelength interchange to reroute wavelengths to change the wavelength availability.

28. A method as in claim 25 wherein reporting the available paths includes displaying the available paths along with the representations of nodes and physical links of the optical network topology; and
wherein reporting the wavelength availability includes displaying the wavelength availability along with the representations of nodes and physical links of the optical network topology.

29. A method as in claim 28 wherein displaying the representations of nodes and physical links includes displaying the representations of nodes and physical links in a base plane of a three-dimensional view;
wherein displaying the available paths along with the representations of nodes and physical links includes displaying the available paths in the base plane along with the representations of nodes and physical links; and
wherein displaying the wavelength availability along with the representations of nodes and physical links includes displaying each available wavelength as part of the three-dimensional view in respective planes elevated above the base plane.

30. A method as in claim 25 wherein reporting the wavelength availability includes displaying the representations of nodes of the optical network topology, selections thereof, the available paths, and the wavelength availability in a tabular format and highlighting the available paths and the wavelength availability.

31. A method as in claim 25 wherein the representations of nodes include representations of reconfigurable optical add/drop multiplexers.

32. A method as in claim 25 wherein the path is a protected path.

33. A method as in claim 25 wherein the path is an unprotected path.

34. An apparatus for providing wavelength availability in an optical network topology, the apparatus comprising:
a display module configured to display representations of nodes and physical links of the optical network topology;
an enabling module configured to enable selection of at least two nodes of the optical network topology;
a determination module configured to determine paths connecting the at least two nodes through the optical network topology and to determine wavelength availability along the paths;
a reporting module configured to report available paths of the paths connecting the at least two nodes, the available paths having at least one available wavelength and to report the wavelength availability along the available paths.

35. The apparatus as in claim 34 wherein the determination module is further configured to determine the availability of a wavelength, including subrate availability within the wavelength; and
wherein the reporting module is further configured to report the subrate availability.

36. The apparatus as in claim 35 further including a wavelength interchange module configured to use wavelength interchange to reroute a wavelength; and
wherein the determination module is further configured to cause the wavelength interchange module to change the wavelength availability in the optical network topology.

37. The apparatus as in claim 34 wherein the reporting module is further configured to cause the display module to display the available paths along with the representations of nodes and physical links of the optical network topology; and
wherein the reporting module is further configured to cause the display module to display the wavelength availability along with the representations of nodes and physical links of the optical network topology.

38. The apparatus as in claim 37 wherein the display module is further configured to display the representations of nodes and physical links in a base plane of a three-dimensional view; and
wherein the reporting module is further configured to cause the display module to display the available paths in the base plane along with the representations of nodes and physical links; and
wherein the reporting module is further configured to cause the display module to display each available wavelength as part of the three-dimensional view in respective planes elevated above the base plan.

39. The apparatus as in claim 34 wherein the reporting module is further configured to cause the display module to display the representations of nodes of the optical network topology, selections thereof, the available paths, and the wavelength availability in a tabular format and to highlight the available paths and the wavelength availability.

40. The apparatus as in claim 34 wherein the representations of nodes include representations of reconfigurable add/drop multiplexers.

41. The apparatus as in claim 34 wherein the path is a protected path.

42. The apparatus as in claim 34 wherein the path is an unprotected path.

43. A computer readable medium having computer readable program codes embodied therein for providing wavelength availability in an optical network topology, the computer readable medium program codes including instructions that, when executed by a processor, cause the processor to:
display representations of nodes and physical links of the optical network topology;
enable selection of at least two nodes of the optical network topology;
determine paths connecting the at least two nodes through the optical network topology;

determine wavelength availability along the paths;
report available paths of the paths connecting the at least two nodes, the available paths having at least one available wavelength; and
report the wavelength availability along the available paths.

* * * * *